(12) United States Patent
Hayashi et al.

(10) Patent No.: US 9,075,878 B2
(45) Date of Patent: Jul. 7, 2015

(54) INFORMATION PROCESSING APPARATUS, CONTENT ITEM MANAGEMENT SYSTEM, NON-TRANSITORY COMPUTER READABLE MEDIUM, AND INFORMATION PROCESSING METHOD

(71) Applicant: FUJI XEROX CO., LTD., Tokyo (JP)

(72) Inventors: Kazuhiro Hayashi, Kanagawa (JP); Shinobu Ozeki, Kanagawa (JP); Akira Tateishi, Kanagawa (JP); Masaru Kijima, Kanagawa (JP); Motoki Taniguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 124 days.

(21) Appl. No.: 13/761,631

(22) Filed: Feb. 7, 2013

(65) Prior Publication Data

US 2014/0052724 A1    Feb. 20, 2014

(30) Foreign Application Priority Data

Aug. 15, 2012    (JP) ................. 2012-180225

(51) Int. Cl.
G06F 17/30    (2006.01)
(52) U.S. Cl.
CPC .... G06F 17/30861 (2013.01); G06F 17/30011 (2013.01)
(58) Field of Classification Search
CPC ... G06F 17/30864; G06Q 10/10; G06Q 30/02
USPC ........................................ 707/736
See application file for complete search history.

(56) References Cited

U.S. PATENT DOCUMENTS

| 7,165,222 | B1 * | 1/2007 | Suzuki | 715/744 |
| 8,224,819 | B2 * | 7/2012 | Sakai et al. | 707/736 |
| 2012/0221601 | A1 * | 8/2012 | Omura et al. | 707/772 |

FOREIGN PATENT DOCUMENTS

| JP | A 2003-337796 | 11/2003 |
| JP | A 2008-181335 | 8/2008 |
| JP | A 2009-146298 | 7/2009 |

OTHER PUBLICATIONS

Zheng et al; "System for Article Summary on Message Boards with PIAT;" The Collected Papers of Multimedia, Distributed, Cooperative and Mobile Symposium (DICOMO2011); Information Processing Society of Japan Series; Jul. 6-8, 2011; vol. 2011, No. 1 (with translation).
Jan. 30, 2013 Office Action issued in Japanese Patent Application No. 2012-180225 (with translation).

* cited by examiner

*Primary Examiner* — Rehana Perveen
*Assistant Examiner* — Dongming Wang
(74) *Attorney, Agent, or Firm* — Oliff PLC

(57) ABSTRACT

Provided is an information processing apparatus including a data acquisition unit that acquires content item data indicating a content item, an identification information generation unit that generates identification information of the content item on the basis of the content item data acquired by the data acquisition unit according to a predefined rule, and a browsing history extraction unit that extracts a browsing history of a user regarding the content item in correlation with the identification information of the content item generated by the identification information generation unit.

10 Claims, 24 Drawing Sheets

DOCUMENT BROWSING APPARATUS 3 AND
BROWSING HISTORY MANAGEMENT APPARATUS 4

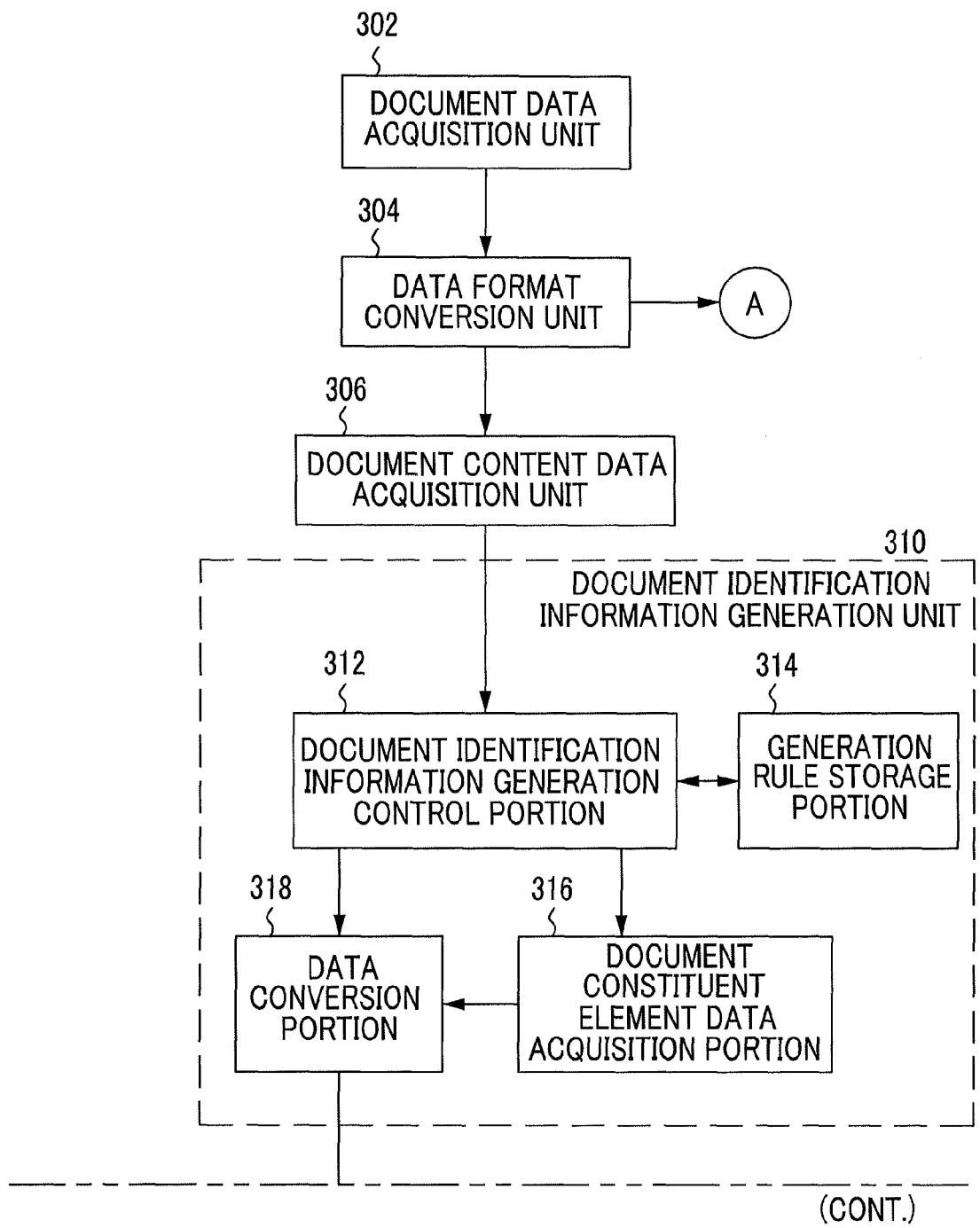

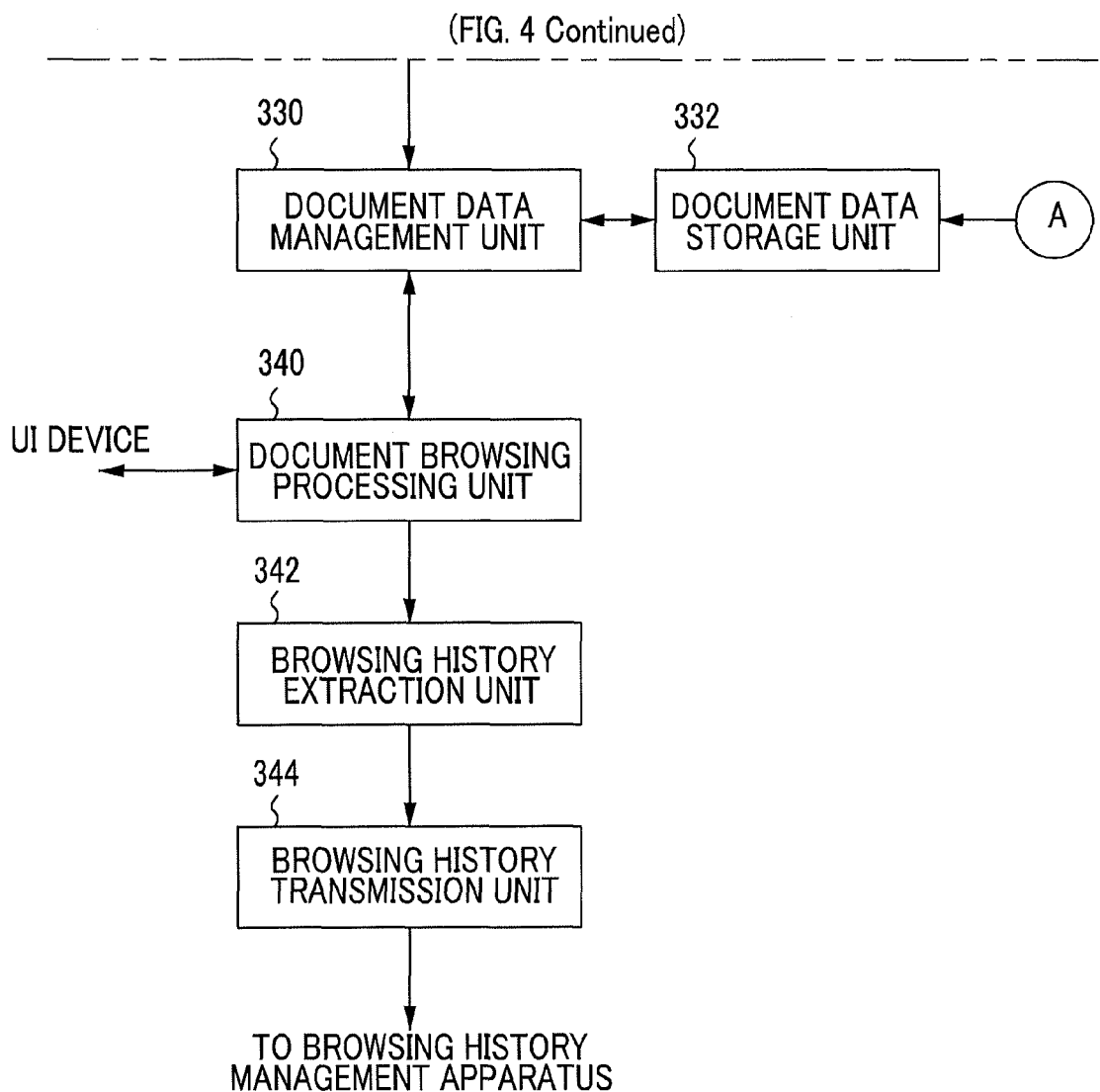

FIG. 5

| GENERATION RULE | GENERATION SOURCE DATA | CONVERSION METHOD |
|---|---|---|
| RULE A | OVERALL DOCUMENT CONTENT DATA | FUNCTION A |
| RULE B | IMAGE DATA | FUNCTION B |
| RULE C | EACH DOCUMENT CONSTITUENT ELEMENT DATA ITEM | FUNCTION C |
| RULE D | OVERALL DOCUMENT CONTENT DATA | DOCUMENT DATA ITSELF (NO CONVERSION) |

FIG. 6
RULE A AND RULE D
DOCUMENT DATA
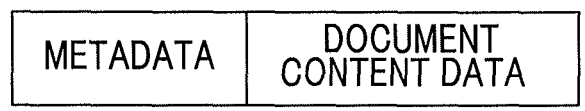
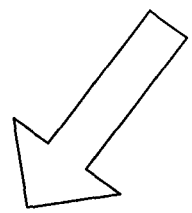
DOCUMENT IDENTIFICATION INFORMATION FIG. 7
RULE B
DOCUMENT DATA
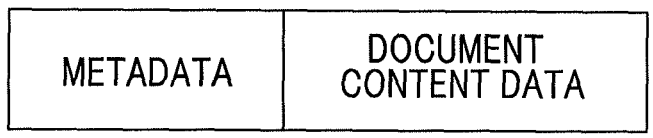
DOCUMENT CONTENT DATA
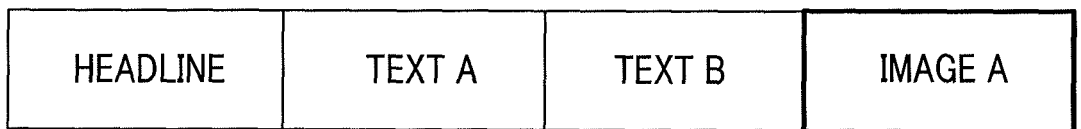
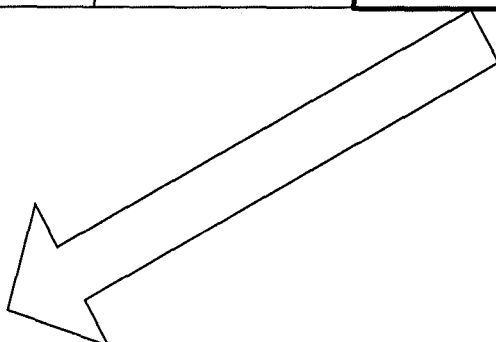
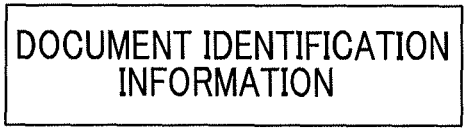

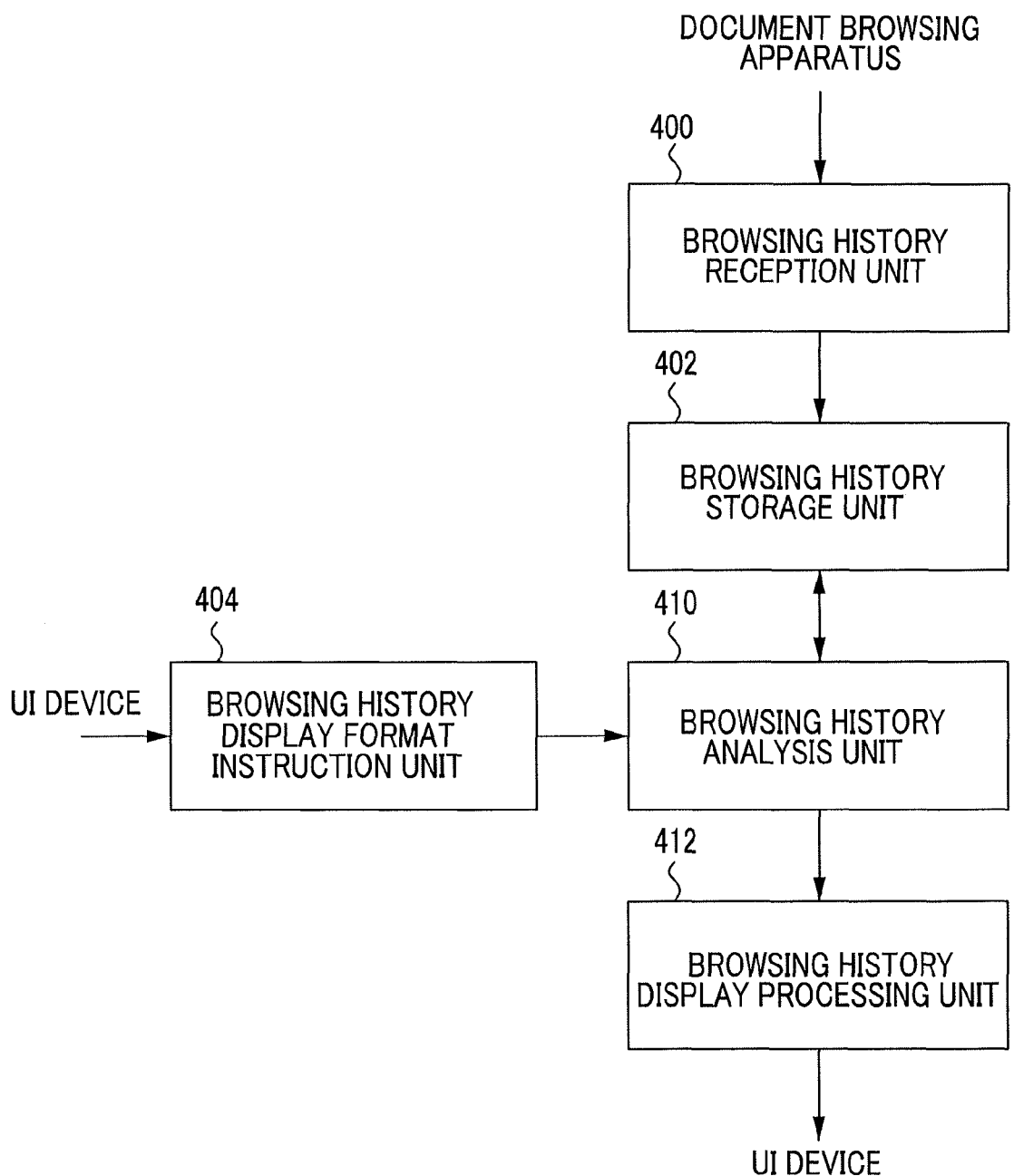

FIG. 11A

BROWSING HISTORY OF USER A

| TIME POINT #1 | USER A | DOCUMENT A | DOCUMENT POSITION P1 | OPERATION X |  |
|---|---|---|---|---|---|
| TIME POINT #2 | USER A | DOCUMENT A | DOCUMENT POSITION P2 | OPERATION Y | OPERATION POSITION (X2,Y2) |
| TIME POINT #3 | USER A | DOCUMENT B | DOCUMENT POSITION P3 | OPERATION X |  |

FIG. 11B

BROWSING HISTORY OF DOCUMENT A

| TIME POINT #1 | USER A | DOCUMENT A | DOCUMENT POSITION P1 | OPERATION X | |
|---|---|---|---|---|---|
| TIME POINT #2 | USER A | DOCUMENT A | DOCUMENT POSITION P2 | OPERATION Y | OPERATION POSITION (X2,Y2) |
| TIME POINT #3 | USER B | DOCUMENT A | DOCUMENT POSITION P3 | OPERATION X | |

FIG. 11C

BROWSING HISTORY OF IMAGE A

| | | | | | | |
|---|---|---|---|---|---|---|
| TIME POINT #1 | USER A | DOCUMENT A | DOCUMENT POSITION P1 | IMAGE A | IMAGE POSITION P4 | OPERATION Y | OPERATION POSITION (X1,Y1) |
| TIME POINT #2 | USER B | DOCUMENT A | DOCUMENT POSITION P1 | IMAGE A | IMAGE POSITION P4 | OPERATION Y | OPERATION POSITION (X1,Y1) |
| TIME POINT #3 | USER C | DOCUMENT B | DOCUMENT POSITION P3 | IMAGE A | IMAGE POSITION P5 | OPERATION Y | OPERATION POSITION (X3,Y3) |

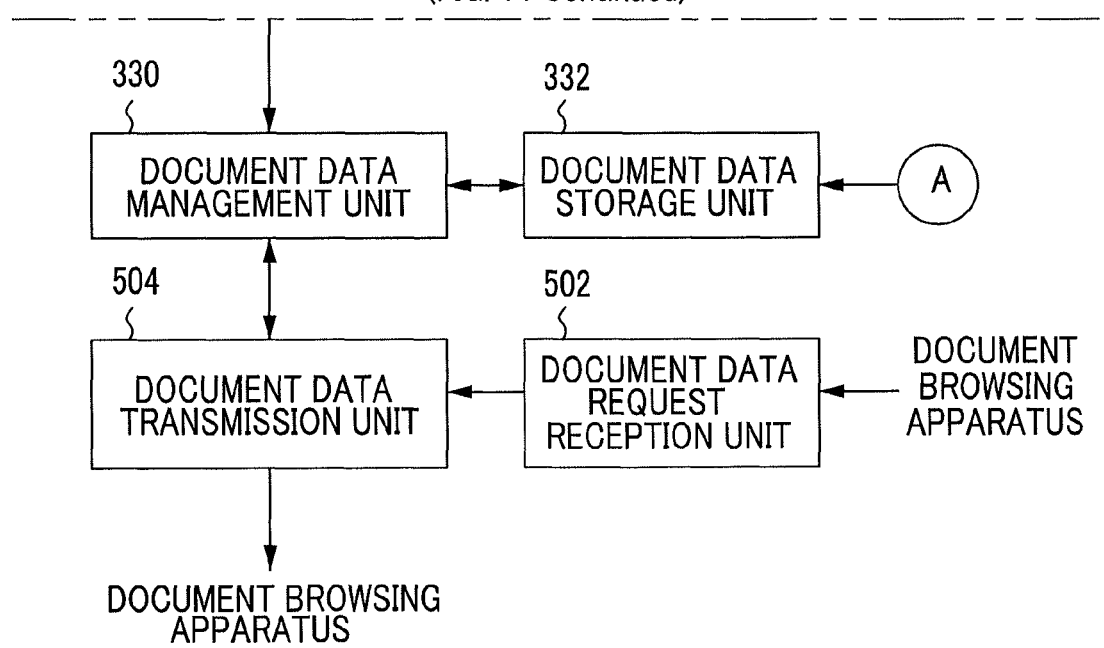

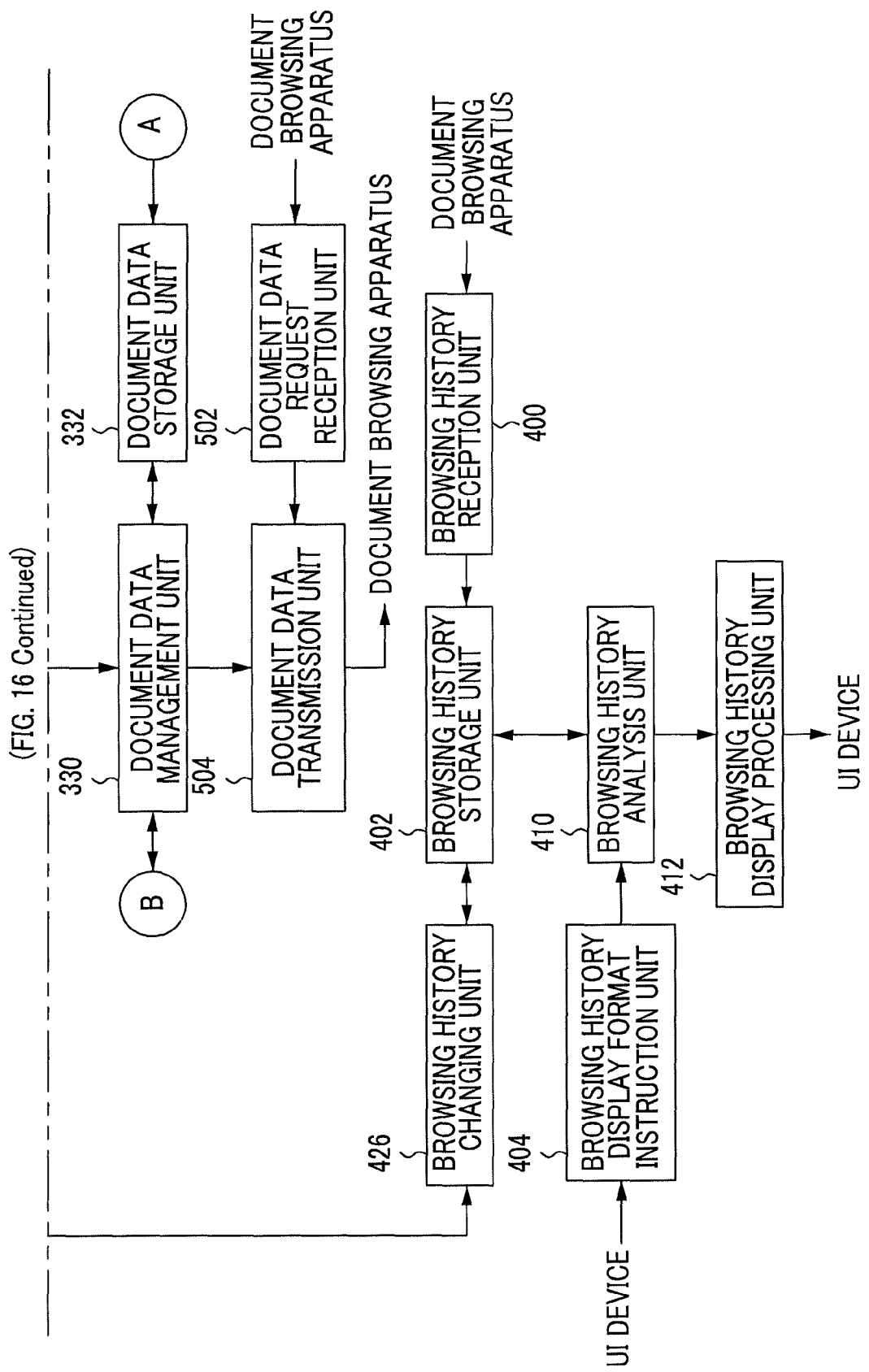

FIG. 17B

| TIME POINT #1 | USER A | DOCUMENT A | DOCUMENT POSITION P1 | OPERATION Y | OPERATION POSITION (X1,Y1) |
|---|---|---|---|---|---|
| TIME POINT #2 | USER A | DOCUMENT A | DOCUMENT POSITION P1 | OPERATION Y | OPERATION POSITION (X2,Y2) |
| TIME POINT #3 | USER B | DOCUMENT B | DOCUMENT POSITION P3 | OPERATION Y | OPERATION POSITION (X3,Y3) |
| TIME POINT #4 | USER B | DOCUMENT B | DOCUMENT POSITION P3 | OPERATION Y | OPERATION POSITION (X4,Y4) |

FIG. 17C

| TIME POINT | USER | DOCUMENT | DOCUMENT POSITION | IMAGE | IMAGE POSITION | OPERATION | OPERATION POSITION |
|---|---|---|---|---|---|---|---|
| #1 | USER A | DOCUMENT A | DOCUMENT POSITION P1 | IMAGE A | IMAGE POSITION P4 | OPERATION Y | OPERATION POSITION (X1,Y1) |
| #2 | USER A | DOCUMENT A | DOCUMENT POSITION P1 | IMAGE B | IMAGE POSITION P6 | OPERATION Y | OPERATION POSITION (X2,Y2) |
| #3 | USER B | DOCUMENT B | DOCUMENT POSITION P3 | IMAGE A | IMAGE POSITION P5 | OPERATION Y | OPERATION POSITION (X3,Y3) |
| #4 | USER B | DOCUMENT B | DOCUMENT POSITION P3 | IMAGE C | IMAGE POSITION P7 | OPERATION Y | OPERATION POSITION (X4,Y4) |

INFORMATION PROCESSING APPARATUS, CONTENT ITEM MANAGEMENT SYSTEM, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2012-180225 filed Aug. 15, 2012.

BACKGROUND

Technical Field

The present invention relates to an information processing apparatus, a content item management system, a non-transitory computer readable medium, and an information processing method.

SUMMARY

According to an aspect of the invention, there is provided an information processing apparatus including a data acquisition unit that acquires content item data indicating a content item; an identification information generation unit that generates identification information of the content item on the basis of the content item data acquired by the data acquisition unit according to a predefined rule; and a browsing history extraction unit that extracts a browsing history of a user regarding the content item in correlation with the identification information of the content item generated by the identification information generation unit.

BRIEF DESCRIPTION OF THE DRAWINGS

Exemplary embodiments of the present invention will be described in detail based on the following figures, wherein:

FIG. 4 is a block diagram illustrating a document browsing apparatus program operated in the document browsing apparatus according to the second exemplary embodiment;

FIG. 5 is a diagram exemplifying a generation rule;

FIG. 6 is a diagram exemplifying a generation process of document identification information performed by the document identification information generation unit;

FIG. 7 is a diagram exemplifying a generation process of document identification information performed by the document identification information generation unit;

FIG. 10 is a block diagram illustrating a browsing history management apparatus program operated in the browsing history management apparatus according to the second exemplary embodiment;

FIGS. 11A to 11C are diagrams exemplifying analysis results performed by a browsing history analysis unit;

FIGS. 17A to 17C are diagrams exemplifying a changing process of browsing history.

DETAILED DESCRIPTION

First Exemplary Embodiment

First, the related art will be described as the first exemplary embodiment.

Figure 1:
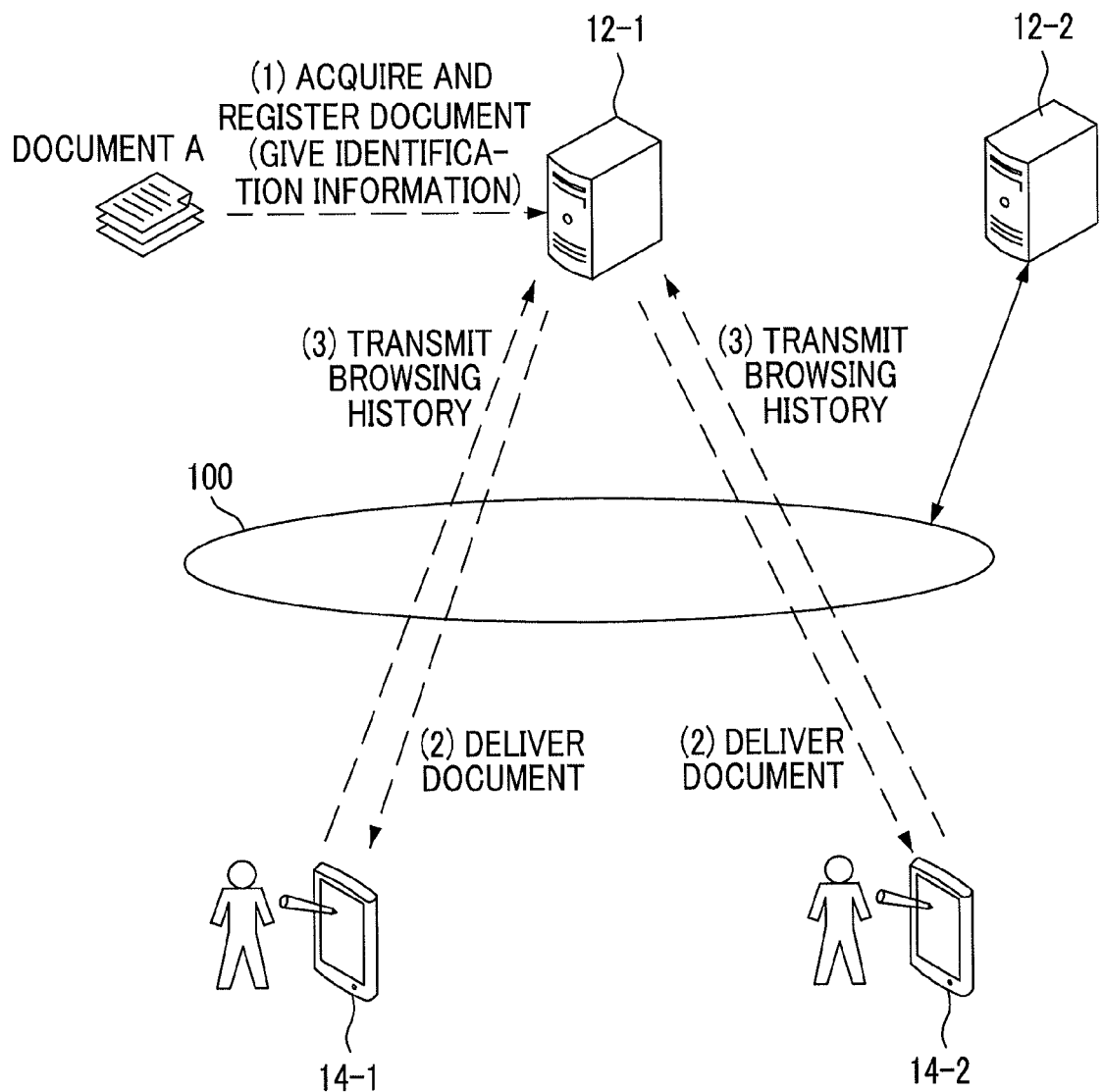
FIG. 1 is a diagram illustrating a document management system according to a first exemplary embodiment.

FIG. 1 is a diagram illustrating a document management system 1 according to the first exemplary embodiment.

As illustrated in FIG. 1, the document management system 1 includes document management apparatuses 12-1 and 12-2 and document browsing apparatuses 14-1 and 14-2 which are connected to each other via a network 100 such as the Internet or a local area network (LAN).

In addition, in the following, the document management apparatuses 12-1 and 12-2 and the like are simply referred to as a document management apparatus 12 and the like when none of the plural constituent elements are specified.

Further, although, in the present exemplary embodiment, two document management apparatuses 12-1 and 12-2 and two document browsing apparatuses 14-1 and 14-2 are illustrated, one or three or more apparatuses may be respectively used (this is also the same for other exemplary embodiments).

The document management apparatus 12 manages a document (content item) which is a target browsed by a user in the document browsing apparatus 14.

The document browsing apparatus 14 performs a process for a user browsing a document.

In addition, in the following respective exemplary embodiments, although a target browsed by a user is a document, the target browsed by the user is not limited to a document, and may be a document, an image, audio, video, and a content item including a variety of information and the like (this is also the same for other exemplary embodiments).

Here, the content item is a variety of information which is a target browsed by a user, and refers to one which may be computerized (digitalized) through any electronic process such as scanning or electronic generation, and one which has already been computerized.

The content item includes, for example, a document formed by characters and a (still) image, an image, audio, and video including moving images.

Further, the document includes one which is printed on a paper medium, an electronic document file (document data), and the like.

The audio includes one which is recorded on a tape, an electronic audio file, and the like.

The video includes one which is recorded on a video tape, an electronic video file, and the like.

In addition, data obtained by computerizing a content item, or data indicating content of a content item which has already been computerized is referred to as content item data in some cases.

The document management apparatus 12 acquires a document, and generates and registers the document data by performing an electronic process on the document so as to computerize the document, and performs a conversion process on the document as necessary (for example, conversion into a portable document format (PDF) form).

In addition, the document management apparatus 12 gives identification information (document identification information) to the registered document data.

Further, the document management apparatus 12 delivers the document to the document browsing apparatus 14 by transmitting the registered document data to the document browsing apparatus 14.

The document browsing apparatus 14 performs a process for a user of the document browsing apparatus 14 who is browsing a document, for example, by displaying the document on a display device (not shown) of the document browsing apparatus 14.

In addition, in a case where the user browses the document, the document browsing apparatus 14 generates history information (browsing history) such as a log regarding the browsing, and transmits the generated browsing history to, for example, the document management apparatus 12 which has delivered the document.

The document management apparatus 12 manages browsing history, and displays browsing history, for example, for each document or each user, through an operation by an administrator of the document management apparatus 12.

Here, the browsing history includes a time point when a user browses a document, user identification information, document identification information, document position information indicating which position of a document is browsed by a user, and information (operation information) indicating that a user performs an operation on a document displayed on a display device (this is also the same for other exemplary embodiments).

Details thereof will be described later.

In the document management system 1 according to the first exemplary embodiment, document identification information is generated by the document management apparatus 12.

At this time, there is a probability that the document identification information generated by the document management apparatus 12-1 when the same document (for example, a document A) is registered in the document management apparatus 12-1 and document identification information generated by the document management apparatus 12-2 when the document is registered in the document management apparatus 12-2 may be different.

Further, there is a probability that different pieces of document identification information may be given even if the same document (for example, a document A) is registered in the same document management apparatus 12-1.

In a case where document identification information is generated based on a registered time point, for example, the document A is registered in the document management apparatus 12-1 at "2012, January 1, 13:00", the document management apparatus 12-1 gives document identification information to the document A as "201201011300", and, in a case where the document A is registered in the document management apparatus 12-2 at "2012, December 1, 01:00", the document management apparatus 12-2 gives document identification information to the document A as "201212010100".

As such, the same document is given the different pieces of document identification information.

Therefore, in a case where even the same document is given different pieces of document identification information, the document management apparatus 12 does not manage browsing history as the same document but manages browsing history as different documents.

In addition, in a case where not the document management apparatus 12 but the document browsing apparatus 14 acquires a document separately from the document management apparatus 12, since document identification information of the document is not given, browsing history regarding the document acquired by the document browsing apparatus 14 is not transmitted to the document management apparatus 12 (even if transmitted, the document management apparatus 12 is unable to appropriately manage the browsing history).

In addition, in a case where the document management apparatus 12 converts document data, if a conversion format is different, a portion of the document data may be different, and thus the document management apparatus 12 recognizes the document as different documents although content of the document is the same.

Second Exemplary Embodiment

Next, the second exemplary embodiment will be described.

Figure 2:
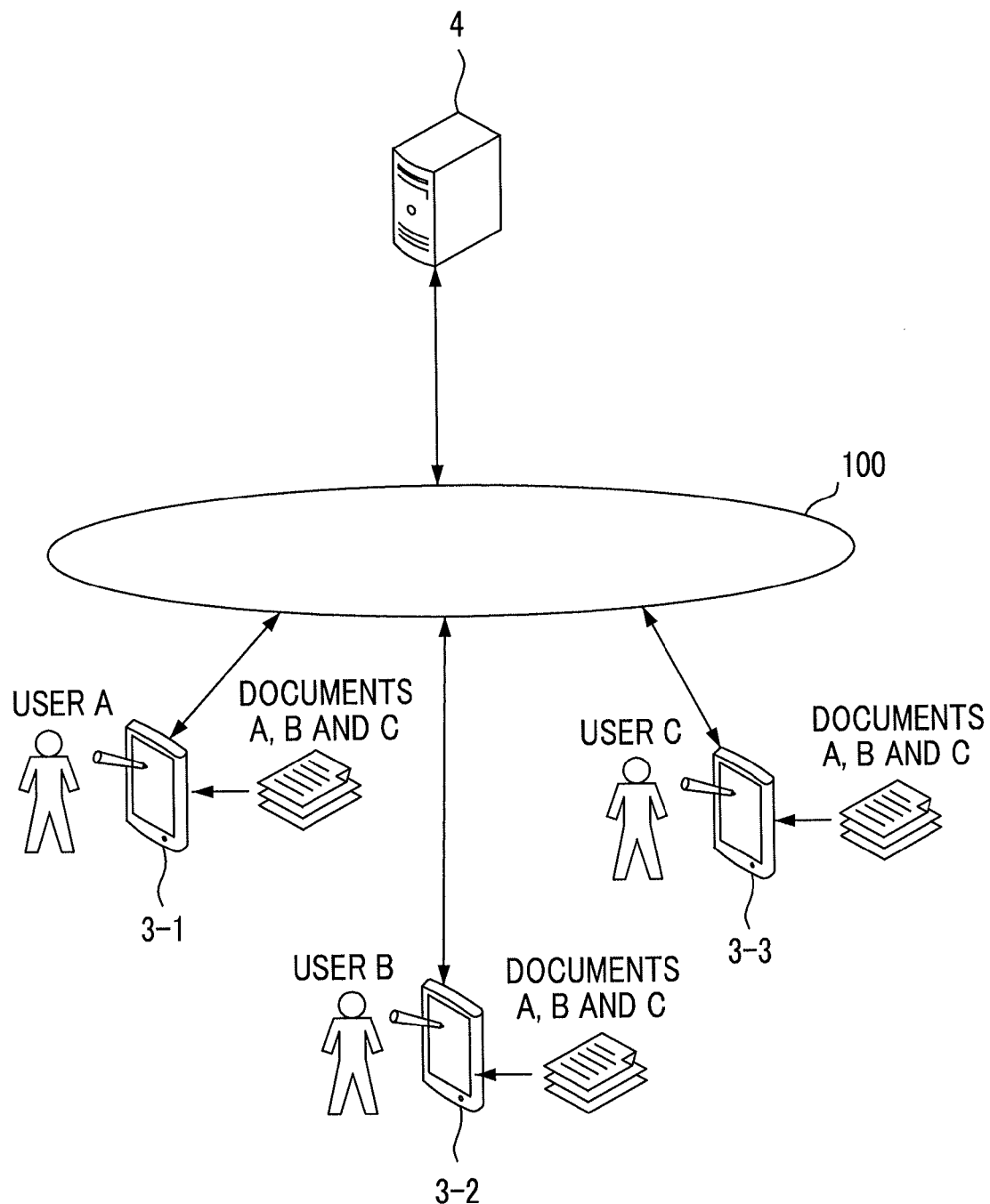
FIG. 2 is a diagram illustrating a document management system according to a second exemplary embodiment.

FIG. 2 is a diagram illustrating a document management system 2 according to the second exemplary embodiment.

As illustrated in FIG. 2, the document management system 2 includes document browsing apparatuses 3-1 to 3-3 and a browsing history management apparatus 4 which are connected to each other via a network 100.

In addition, each constituent element of the document browsing apparatus 3 and each constituent element of the browsing history management apparatus 4 described in the following may be used for other apparatuses (this is also the same for other exemplary embodiments).

In other words, at least one of constituent elements of the document browsing apparatus 3 may be in the browsing history management apparatus 4, and at least one of constituent elements of the browsing history management apparatus 4 may be in the document browsing apparatus 3.

Each document browsing apparatus 3 performs a process for a user browsing a document.

In addition, each document browsing apparatus 3 acquires document content data (content item data) indicating content of a document which is a browsed target, and generates document identification information for identifying the document on the basis of the document content data according to a predefined rule.

Further, when a user browses the document, each document browsing apparatus 3 extracts browsing history correlated with the generated document identification information, and transmits the extracted browsing history to the browsing history management apparatus 4.

The browsing history management apparatus 4 manages the browsing history from the document browsing apparatus 3, and displays the browsing history through an operation, for example, by an administrator of the browsing history management apparatus 4.

Figure 3:
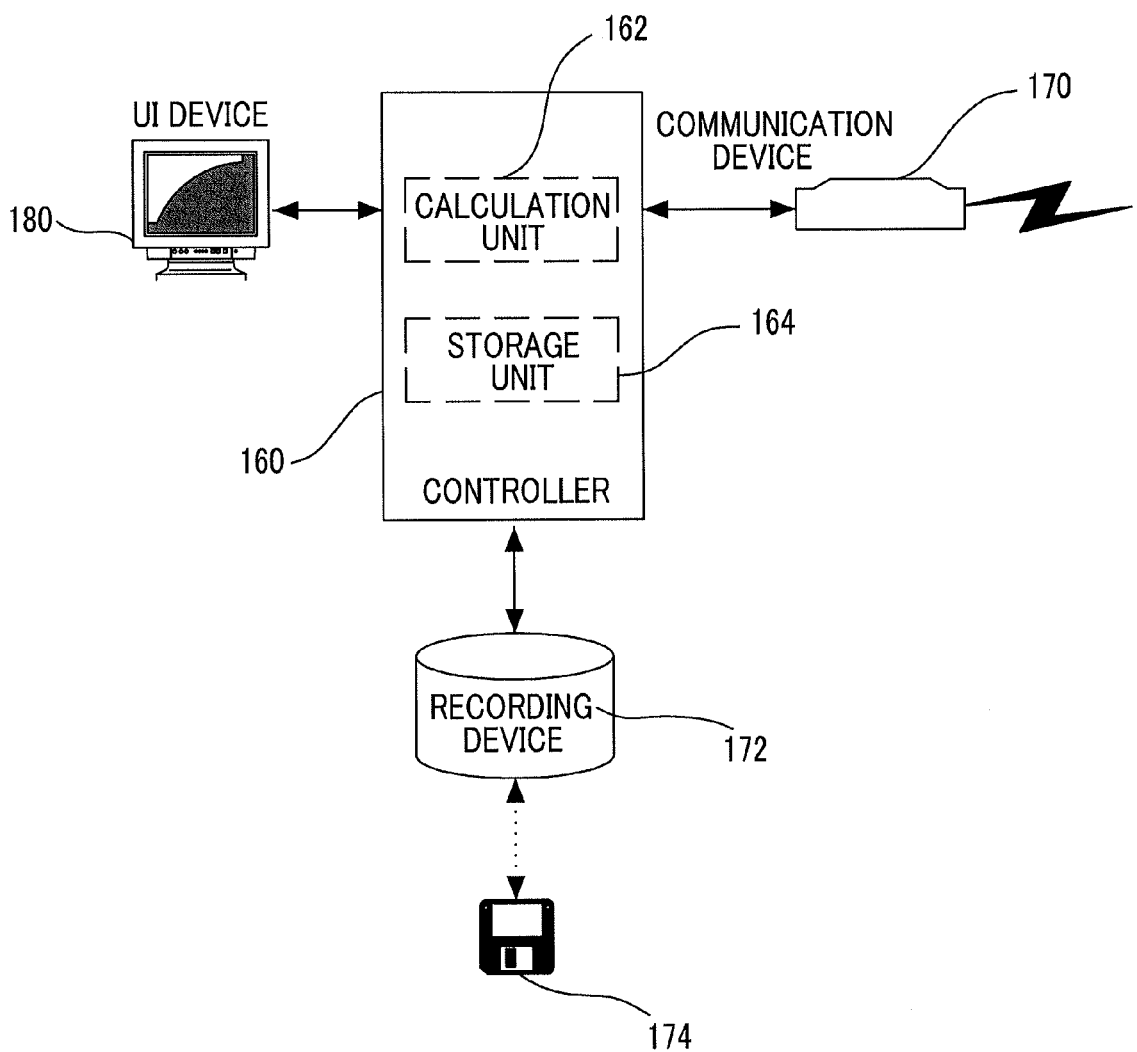
FIG. 3 is a diagram illustrating a hardware configuration of the document browsing apparatus and the browsing history management apparatus illustrated in FIG. 2.

FIG. 3 is a diagram illustrating a hardware configuration of the document browsing apparatus 3 and the browsing history management apparatus 4 illustrated in FIG. 2.

As illustrated in FIG. 3, the document browsing apparatus 3 and the browsing history management apparatus 4 include a controller 160 which has a calculation unit 162 such as a CPU and a storage unit 164 such as a memory, a communication device 170 which performs communication via a network, a recording device 172, a recording medium 174 such as a USB memory or an SD memory card, and a user interface device (UI device) 180.

In other words, the document browsing apparatus 3 and the browsing history management apparatus 4 are an information processing apparatus which has hardware constituent elements as a computer which may communicate with information processing and other processing devices or terminals.

In addition, in the following respective drawings, the substantially same constituent elements and processes are given the same reference numerals.

The UI device 180 includes a graphical user interface (GUI), a display device such as a liquid crystal display (LCD) device or a cathode ray tube (CRT) display device, a keyboard or a touch panel, and the like.

In addition, each apparatus in the other exemplary embodiments described below also has the hardware configuration illustrated in FIG. 3 and is thus an information processing apparatus having hardware constituent elements as a computer which may communicate with the information processing and other processing devices or terminals.

FIG. 4 is a block diagram illustrating a document browsing apparatus program 30 which is operated in the document browsing apparatus 3 according to the second exemplary embodiment.

As illustrated in FIG. 4, the document browsing apparatus program 30 includes a document data acquisition unit 302, a data format conversion unit 304, a document content data acquisition unit 306, a document identification information generation unit 310, a document data management unit 330, a document data storage unit 332, a document browsing processing unit 340, a browsing history extraction unit 342, and a browsing history transmission unit 344.

The document identification information generation unit 310 includes a document identification information generation control portion 312, a generation rule storage portion 314, a document constituent element data acquisition portion 316, and a data conversion portion 318.

The document data acquisition unit 302 acquires document data indicating a document which is a target browsed by a user.

Specifically, for example, the document data acquisition unit 302 acquires document data stored on the recording medium 174, acquires document data by downloading the document data from a server (not shown) via the network 100, or acquires document data which is obtained by a reading device (not shown) reading a document formed on a paper medium.

The data format conversion unit 304 converts a format of document data into an appropriate format to browse a document in each document browsing apparatus 3, and stores the converted document data in the document data storage unit 332.

Specifically, for example, in a case where a document is browsed in a PDF format in the document browsing apparatus 3-1, the data format conversion unit 304 of the document browsing apparatus 3-1 converts a format of document data into the PDF format.

In addition, in a case where a document is browsed in a hyper text markup language (HTML) format in the document browsing apparatus 3-2, the data format conversion unit 304 of the document browsing apparatus 3-2 converts a format of document data into the HTML format.

In addition, although, in the present exemplary embodiment, the data format conversion unit 304 converts a data format of document data, conversion of a data format of document data is not necessarily performed, and the data format conversion unit 304 may not convert a data format.

The document content data acquisition unit 306 acquires document content data indicating content of a document from the document data converted by the data format conversion unit 304 (or document data before being converted which is acquired by the document data acquisition unit 302), and outputs the acquired document content data to the document identification information generation unit 310.

Here, the document content data includes, for example, data which indicates a headline and a text formed by characters, constituting content of a document, and data which indicates an image, but does not include metadata.

Here, the metadata includes a time point when document data is generated, or attribute data such as an identifier of an apparatus generating document data or a file name of document data.

In addition, the data indicating a headline and a text and the data indicating an image may be expressed, for example, as binary data in which color data is represented for each pixel such as a bit map format, or the data indicating a headline and a text may be expressed as text data, and the data indicating an image may be expressed as vector data.

In addition, the document content data may include the data indicating a headline, the data indicating a text, and the data indicating an image, as headline data, text data, and image data, respectively and independently.

In addition, hereinafter, in some cases, elements constituting the content of a document such as a headline, a text and an image (objects) are collectively referred to as document constituent elements, and data indicating the document constituent elements is collectively referred to as document constituent element data.

The document identification information generation control portion 312 performs a control so as to generate document identification information on the basis of the document content data from the document content data acquisition unit 306 according to a generation rule stored in the generation rule storage portion 314.

Specifically, the document identification information generation control portion 312 converts the overall or a portion of the document content data according to the generation rule by using a predefined function (for example, a hash function or the like) shown in the generation rule, and controls each constituent element of the document identification information generation unit 310 so as to set the converted data as document identification information.

The function will be described later.

The generation rule storage portion 314 stores a generation rule indicating a rule for generating document identification information from the document content data.

The document browsing apparatuses 3-1 to 3-3 store the same generation rule.

FIG. 5 is a diagram exemplifying a generation rule.

The rule A indicates that the overall document content data is converted using the function A, and the obtained data is set as document identification information.

The rule B indicates that image data which is a document constituent element is extracted from the document content data, the image data is converted using the function B, and the obtained data is set as document identification information.

The rule C indicates that the respective document constituent elements are extracted from the document content data, the respective extracted document constituent elements are converted using the function C, and the obtained data items are combined so as to be set as document identification information.

The rule D indicates that no conversion process is performed, and the overall document content data itself is set as document identification information.

For example, the document browsing apparatuses 3-1 to 3-3 (the generation rule storage portions 314 thereof) respectively store one or more generation rules (for example, the rule A) exemplified in FIG. 5.

The document identification information generation control portion 312 instructs the document constituent element data acquisition portion 316 to extract document constituent element data indicating generation source data of the generation rule stored in the generation rule storage portion 314 from the document content data.

In addition, the document identification information generation control portion 312 instructs the data conversion portion 318 to convert the data from the document constituent element data acquisition portion 316 by using a function shown in the conversion method of the generation rule stored in the generation rule storage portion 314.

When the instruction is received from the document identification information generation control portion 312, the document constituent element data acquisition portion 316 extracts the document constituent element data (the document content data itself in a case where the generation source data is the overall document content data) which is the generation source data from the document content data and outputs the extracted document constituent element data to the data conversion portion 318.

The data conversion portion 318 converts the document constituent element data (or the document content data itself) extracted by the document constituent element data acquisition portion 316 by using the function shown in the conversion method of the generation rule stored in the generation rule storage portion 314.

In addition, the data conversion portion 318 generates the data which has been obtained through the conversion as document identification information, and outputs the generated data to the document data management unit 330.

Figure 8:
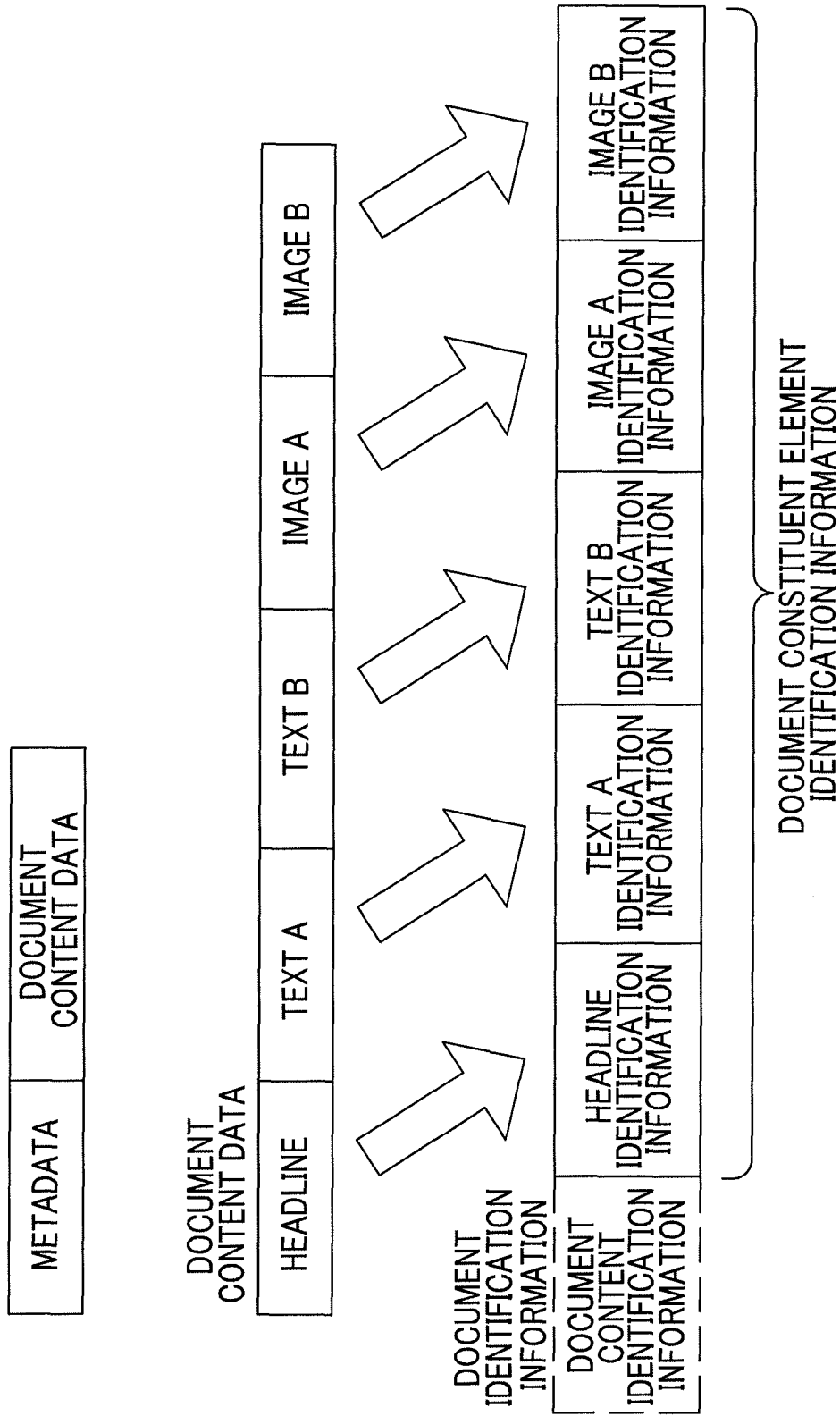
FIG. 8 is a diagram exemplifying a generation process of document identification information performed by the document identification information generation unit.

FIGS. 6 to 8 are diagrams exemplifying a generation process of document identification information performed by the document identification information generation unit 310.

FIG. 6 exemplifies a generation process of document identification information in a case where generation source data shown in the generation rule stored in the generation rule storage portion 314 is the overall document content data (in a case of the rule A and the rule D in the example of FIG. 5).

The document data includes metadata and document content data.

The document constituent element data acquisition portion 316 extracts document content data itself from the document content data.

The data conversion portion 318 converts the document content data by using the function (the function A in a case of the rule A of FIG. 5) shown in the generation rule stored in the generation rule storage portion 314 and sets the converted data as document identification information.

In addition, in a case of the rule D of FIG. 5, the data conversion portion 318 sets the document content data itself as document identification information.

FIG. 7 exemplifies a generation process of document identification information in a case where generation source data shown in the generation rule stored in the generation rule storage portion 314 is image data of the document content data (in a case of the rule B in the example of FIG. 5).

The document data includes metadata and document content data, and the document content data is constituted by, for example, headline data, text A data indicating a text A, text B data indicating a text B, and image A data indicating an image A.

The document constituent element data acquisition portion 316 extracts the image A data which is image data from the document content data.

The data conversion portion 318 converts the image A data by using the function (the function B in a case of the rule B of FIG. 5) shown in the generation rule stored in the generation rule storage portion 314 and sets the converted data as document identification information.

FIG. 8 exemplifies a generation process of document identification information in a case where generation source data shown in the generation rule stored in the generation rule storage portion 314 is document constituent element data of the document content data (in a case of the rule C in the example of FIG. 5).

The document data includes metadata and document content data, and the document content data is constituted by, for example, headline data, text A data indicating a text A, text B data indicating a text B, image A data indicating an image A, and image B data indicating an image B.

The document constituent element data acquisition portion 316 extracts the headline data, the text A data, the text B data, the image A data, and the image B data from the document content data.

The data conversion portion 318 converts the headline data, the text A data, the text B data, the image A data, and the image B data, respectively, by using the function (the function C in a case of the rule C of FIG. 5) shown in the generation rule stored in the generation rule storage portion 314, and obtains headline identification information, text A identification information, text B identification information, image A identification information, and image B identification information.

In addition, the data conversion portion 318 combines the obtained headline identification information, text A identification information, text B identification information, image A identification information, and image B identification information, and sets the combined data as document identification information.

In addition, in this case, the data conversion portion 318 may further combine document content identification information which is obtained by converting the overall document content data therewith so as to be set as document identification information.

The document data management unit 330 (FIG. 4) correlates the document identification information received from the document identification information generation unit 310 (the data conversion portion 318) with document data which is identified by the received document identification information and is stored in the document data storage unit 332 so as to be managed.

In a case where a user performs an operation for browsing a document on the UI device 180, the document browsing processing unit 340 receives operation information generated by the operation.

Specifically, for example, the user selects a document which is desired to be browsed using the UI device 180.

At this time, the document data management unit 330 outputs document data of the document selected by the user to the document browsing processing unit 340, and the document browsing processing unit 340 displays the received document data on the UI device 180.

In addition, when the user performs an operation according to browsing of the document on the UI device 180, the document browsing processing unit 340 changes the display so as to correspond to the operation.

Specifically, in a case where the user performs an operation so as to scroll a screen on which the document data is displayed, the document browsing processing unit 340 changes a position of the displayed document by moving the screen.

In addition, in a case where the user performs an operation so as to enlarge (or reduce) the screen on which the document data is displayed, the document browsing processing unit 340 performs display such that the displayed document is enlarged (or reduced).

The browsing history extraction unit 342 extracts browsing history each time the document browsing processing unit 340 changes display (or for each specific time), and outputs the extracted browsing history to the browsing history transmission unit 344.

The browsing history transmission unit 344 transmits the received browsing history to the browsing history management apparatus 4.

Figure 9:
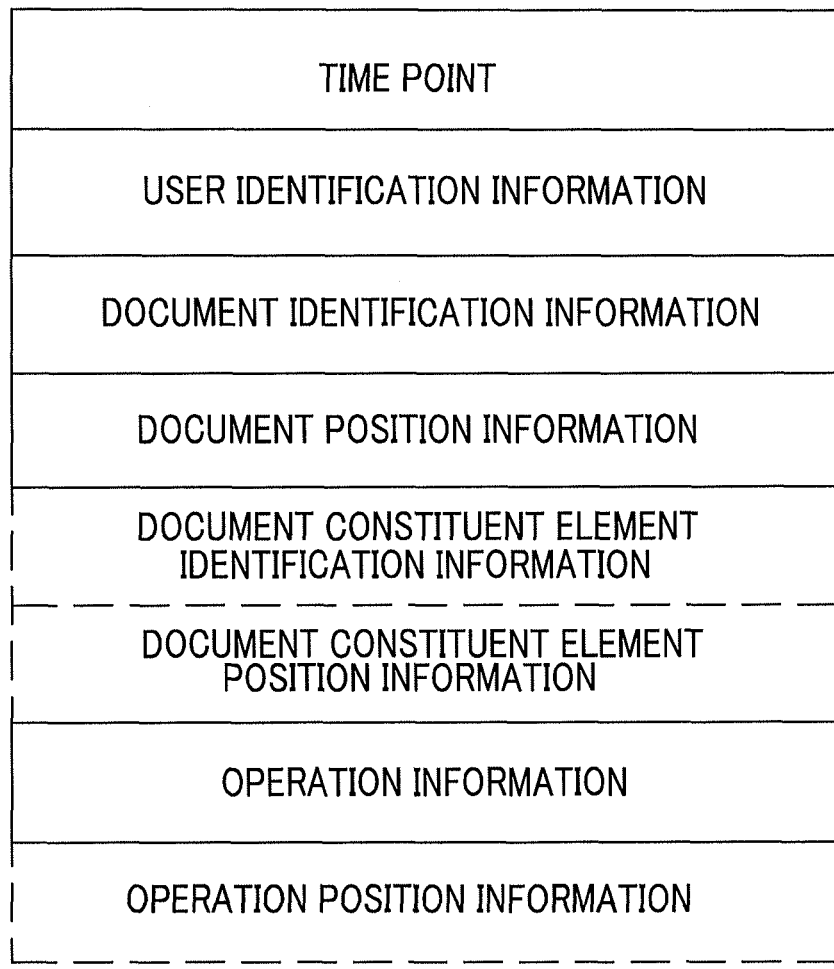
FIG. 9 is a diagram exemplifying browsing history extracted by the browsing history extraction unit.

FIG. 9 is a diagram exemplifying the browsing history extracted by the browsing history extraction unit 342.

As illustrated in FIG. 9, the browsing history includes a time point, user identification information of a user which performs an operation (or identification information of the document browsing apparatus 3), document identification information of a document of which browsing is in progress, document position information indicating a position of a document displayed on the UI device 180, and operation information indicating that a user performs an operation on the UI device 180.

In addition, in a case where identification information is generated for each document constituent element (an image or the like) (the example of FIG. 8), the browsing history also includes identification information of a document constituent element displayed on the UI device 180, and position information of the document constituent element.

In addition, in a case where an operation is performed such that the finger or a touch pen of the user is touched on a touch panel (the UI device 180) which displays a document, operation position information indicating the position coordinates of the document corresponding to the touch position may be included.

The document position information is information indicating, for example, a position of a region of the document displayed on the screen of the UI device 180, and, includes, for example, coordinates corresponding to the upper left side of the screen and coordinates corresponding to the lower right side thereof.

The document constituent element position information is information indicating a position of a region of the document constituent element, and includes, for example, coordinates of the upper left side and coordinates of the lower right side of the document constituent element.

In addition, in a case where a document which is a browsing target is divided into pages, the document position information and the operation position information may include page numbers.

In addition, in the present exemplary embodiment, the browsing history may not include document data, and, in this case, document data is not transmitted to the browsing history management apparatus 4, and it is not necessary for the browsing history management apparatus 4 to manage document data.

FIG. 10 is a block diagram illustrating a browsing history management apparatus program 40 which is operated in the browsing history management apparatus 4 according to the second exemplary embodiment.

As illustrated in FIG. 10, the browsing history management apparatus program 40 includes a browsing history reception unit 400, a browsing history storage unit 402, a browsing history display format instruction unit 404, a browsing history analysis unit 410, and a browsing history display processing unit 412.

The browsing history reception unit 400 receives browsing history from the document browsing apparatus 3 so as to be stored in the browsing history storage unit 402.

In a case where an administrator of the browsing history management apparatus 4 operates the UI device 180 so as to instruct in what format the browsing history is displayed, the browsing history display format instruction unit 404 receives display format instruction information indicating the instruction from the UI device 180 so as to be output to the browsing history analysis unit 410.

For example, in a case where the administrator operates the UI device 180 so as to display history of browsing which a certain user (for example, the user A) of the document browsing apparatus 3 performs on one or more documents, the display format instruction information includes information indicating that the browsing history is displayed and identification information of the target user (the user A).

In addition, in a case where the administrator operates the UI device 180 so as to display history of browsing which one or more users perform on a certain single document (for example, the document A), the display format instruction information includes information indicating that the browsing history is displayed and identification information of the target document (the document A).

Further, in a case where the administrator operates the UI device 180 so as to display history of browsing which one or more users perform on a certain single document constituent element (for example, the image A), the display format instruction information includes information indicating that the browsing history is displayed and identification information of the target document constituent element (the image A).

Furthermore, history (ranking) of a document on which a predetermined number or more of certain operations (for example, an enlargement operation) have been performed may be displayed, and, in this case, the display format instruction information includes information indicating that the history is displayed and information indicating the corresponding operation.

At this time, for example, the number of enlargement operations which have been performed on the document A and the number of enlargement operations which have been performed on the document B are displayed.

In addition, the browsing history display format instruction unit 404 also instructs a display form such as, for example, graph display, heat map display, or moving image display, when the browsing history is displayed.

Further, the moving image display is to reproduce transition of a screen and history of operations which have been performed on a certain document by a user with moving images.

In a case of the heat map display, the browsing history management apparatus 4 may receive document data, display the document data on the UI device 180, and display a heat map so as to be superimposed thereon.

In addition, an instruction for displaying history may be performed by not an administrator but a user of the document browsing apparatus 3.

In order to perform display of operation history corresponding to the received display format instruction information, the browsing history analysis unit 410 analyzes each piece of the browsing history stored in the browsing history storage unit 402, and outputs information indicating the analysis result to the browsing history display processing unit 412.

Specifically, in a case where the display format instruction information indicates that browsing history of a certain user (the user A) is displayed, the browsing history analysis unit 410 extracts each piece of browsing history including identification information of the user from the browsing history storage unit 402, and arranges the respective pieces of extracted browsing history in order of time points or for each document.

In addition, in a case where the display format instruction information indicates that browsing history of a certain document (the document A) is displayed, the browsing history analysis unit 410 extracts each piece of browsing history including document identification information of the document from the browsing history storage unit 402, and arranges the respective pieces of extracted browsing history in order of time points or for each user having browsed the document.

Further, in a case where the display format instruction information indicates that browsing history of a certain document constituent element (the image A) is displayed, the browsing history analysis unit 410 extracts each piece of browsing history including document constituent element identification information of the document constituent element from the browsing history storage unit 402, and arranges the respective pieces of extracted browsing history in order of time points for each document or for each user having browsed the document constituent element.

FIGS. 11A to 11C are diagrams exemplifying analysis results performed by the browsing history analysis unit 410.

FIG. 11A exemplifies an analysis result in a case where browsing history of the user A is displayed.

FIG. 11A illustrates that the user A has performed an operation X for displaying a document position P1 of the document A at the time point #1, the user A has displayed a document position P2 of the document A and performs an operation Y (for example, an enlargement operation) on a position (X2, Y2) of the document A at the time point #2, and the user A has performed an operation X for displaying a document position P3 of the document B at the time point #3.

As above, the browsing history management apparatus 4 manages history of browsing which has been performed on the different documents A and B by a certain user A, and manages an operation performed by the user A and a position of the document related to the operation together.

At this time, the browsing history management apparatus 4 may not store document data of the browsed documents A and B.

FIG. 11B exemplifies an analysis result in a case where browsing history of the document A is displayed.

FIG. 11B illustrates that the user A has performed an operation X for displaying a document position P1 of the document A at the time point #1, the user A has displayed a document position P2 of the document A and performs an operation Y on a position (X2,Y2) of the document A at the time point #2, and the user B has performed an operation X for displaying a document position P3 of the document A at the time point #3.

As above, the browsing history management apparatus 4 manages history of browsing which has been performed on the document A by the different users A and B, and manages operations performed by the users A and B and positions of the document related to the operations together.

Here, the browsing history of the user A is transmitted from the document browsing apparatus 3-1 of the user A, and the browsing history of the user B is transmitted from the document browsing apparatus 3-2 of the user B.

The document identification information of the document A included in the browsing history of the user A has been generated by the document browsing apparatus 3-1, and the document identification information of the document A included in the browsing history of the user B has been generated by the document browsing apparatus 3-2.

In other words, the document browsing apparatus 3-1 and the document browsing apparatus 3-2 which are separate apparatuses generate the same document identification information for the same document A.

That is to say, the document A which has been browsed by the user A and the document A which has been browsed by the user B have the same document identification information, and thus the browsing history management apparatus 4 manages the document A which has been browsed by the user A and the document A which has been browsed by the user B as the same document.

FIG. 11C exemplifies an analysis result in a case where browsing history of the image A is displayed.

FIG. 11C illustrates that the user A has displayed a document position P1 of the document A and performs an operation Y on a position (X1, Y1) of the document A located at an image position P4 at the time point #1.

Here, the image position P4 is located inside the document position P1, and the position (X1, Y1) is located inside the image position P4.

Similarly, FIG. 11C illustrates that the user B has displayed a document position P1 of the document A and performs the operation Y on a position (X1, Y1) of the image A located at the image position P4 at the time point #2, and the user C has displayed a document position P3 of the document B and performs the operation Y on a position (X3, Y3) of the image A located at an image position P5 at the time point #3.

Here, the image position P5 is located inside the document position P3, and the position (X3, Y3) is located inside the image position P4.

As above, the browsing history management apparatus 4 manages history of browsing which has been performed on the same image (the image A) included in the different documents (the documents A and B) by the users A and B, and manages operations which have been performed by the users A and B and positions of the documents related to the operations together.

In addition, the "same image" is not necessarily exactly the same, and may be different in, for example, a size, a resolution, a shade, a tone, or the like.

In the same manner as in the above-described example, the browsing history of the user A is transmitted from the document browsing apparatus 3-1 of the user A, the browsing history of the user B is transmitted from the document browsing apparatus 3-2 of the user B, and the browsing history of the user C is transmitted from the document browsing apparatus 3-3 of the user C.

The document identification information of the document A included in the browsing history of the user A and the document constituent element identification information of the image A included therein has been generated by the document browsing apparatus 3-1, the document identification information of the document A included in the browsing history of the user B and the document constituent element identification information of the image A included therein has been generated by the document browsing apparatus 3-2, and the document identification information of the document B included in the browsing history of the user C and the document constituent element identification information of the image A included therein has been generated by the document browsing apparatus 3-3.

In other words, the document browsing apparatus 3-1, the document browsing apparatus 3-2, and the document browsing apparatus 3-3 which are separate apparatuses generate the same document constituent element identification information for the same image included in the documents A and B.

Even in a case where a different user browses a different document using a different document browsing apparatus 3, the browsing history management apparatus 4 extracts browsing history regarding the different document including the same document constituent element when the same document constituent element is included in the document.

The browsing history display processing unit 412 (FIG. 10) displays the browsing history on the UI device 180 according to the analysis result by the browsing history analysis unit 410.

In addition, the browsing history may be displayed on the UI device 180 of the document browsing apparatus 3.

In this case, the browsing history management apparatus 4 transmits the browsing history to the document browsing apparatus 3.

Further, the browsing history display format instruction unit 404 may receive an instruction from the document browsing apparatus 3.

As to Function

Hereinafter, the function shown in the conversion method of the generation rule exemplified in FIG. 5 will be described.

In addition, the function described below is also the same for the other embodiments.

The function may be a function which gives the same output value for the same input value, and a data amount of an output value is equal to or less than a data amount of an input value.

In addition, an output value (document identification information) of the function may be an array of one-dimensional numbers, or may be numbers distributed to n-dimensional spaces.

Further, in order to reduce a frequency in which to give the same output value for different input values (conflict between output values) occurs, the function may have characteristics in which output values are uniformly distributed over a space to which the output values belong for all input values.

An example of the function may include a hash function, and, examples of the hash function may include MD5, SHA-0, SHA-1, and SHA-2.

In addition, characteristics of an employed function may be appropriately selected according to a use form of the document management system 2.

For example, in a case where browsing history regarding a different document of similar content is desired to be extracted, an employed function may have characteristics of giving a similar output for a similar input.

In addition, for example, even in a case where document constituent elements area little different, such as image data being different since a size, a resolution, a shade, a tone, or the like is different although images are inherently the same image, a function which gives the same document constituent element identification information as an output value may be employed in a case where such document constituent element data is an input value.

On the other hand, in a case where original document content data is desired to be prevented from being estimated from document identification information, and even a subtle variation due to falsification is desired to be detected, an employed function may have uni-directional characteristics, that is, cryptographic characteristics in which to give an input value from an output value is very difficult.

In addition, in a case where a user intends to prevent document identification information pieces from being conflicted, a function having a stronger encryption strength may be selected.

In addition, plural functions may be connected and used.

In other words, plural output values are generated from the same input value (document content data) by using plural functions, and a combination of the output values may be used as document identification information.

In addition, a data amount (code length) of document identification information which is an output value of a function may be appropriately selected.

In a case where there are a large number of documents to be treated, or in a case where to give the same document identification information to different documents is desired to be prevented as much as possible, a conflict probability of document identification information may be reduced by selecting a function which increases a data amount of the document identification information.

On the other hand, in a case where there are a small number of documents to be treated, or in a case where to give the same document identification information to different documents is allowed due to circumstances such as presence of subsequent processes, a data amount of the document identification information may be reduced by selecting a function which reduces a data amount of the document identification information, thereby decreasing calculation costs, storage costs, and the like.

In other words, a data amount of document identification information is calculated from a relationship between the number of managed documents and an allowable conflict probability.

Third Exemplary Embodiment

Next, the third exemplary embodiment will be described.

Figure 12:
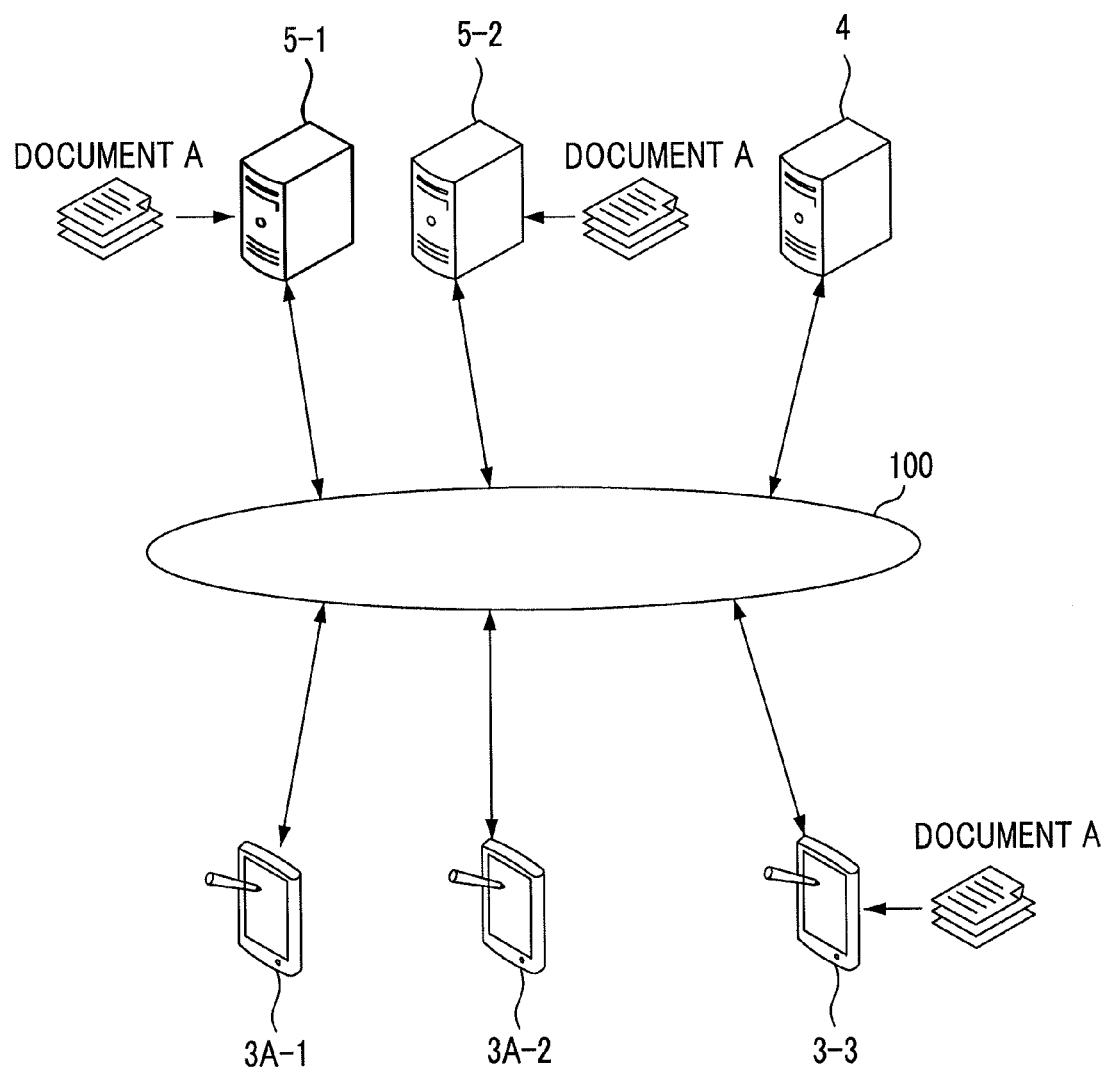
FIG. 12 is a diagram illustrating a document management system according to a third exemplary embodiment.

FIG. 12 is a diagram illustrating a document management system 22 according to the third exemplary embodiment.

As illustrated in FIG. 12, the document management system 22 includes document browsing apparatuses 3A-1, 3A-2 and 3-3, a browsing history management apparatus 4, and document management apparatuses 5-1 and 5-2, which are connected to each other via a network 100.

In the same manner as the document management apparatus 12, the document management apparatus 5 acquires a document, and generates and registers document data by performing an electronic process on the document so as to computerize the document, and performs a conversion process on the document as necessary.

In addition, in the same manner as the document browsing apparatus 3, the document management apparatus 5 acquires document content data (content item data) indicating content of an acquired document, and generates document identification information for identifying the document on the basis of the document content data according to a predefined rule.

In addition, the document management apparatus 5 transmits document data to the document browsing apparatus 3 in correlation with document identification information of the document data, thereby delivering the document to the document browsing apparatus 3A.

Here, transmission of the document data may be, for example, in a download form or a streaming form.

In a case where a user browses the document, the document browsing apparatus 3A extracts browsing history in correlation with the document identification information thereof, and transmits the extracted browsing history to the browsing history management apparatus 4.

Figure 13:
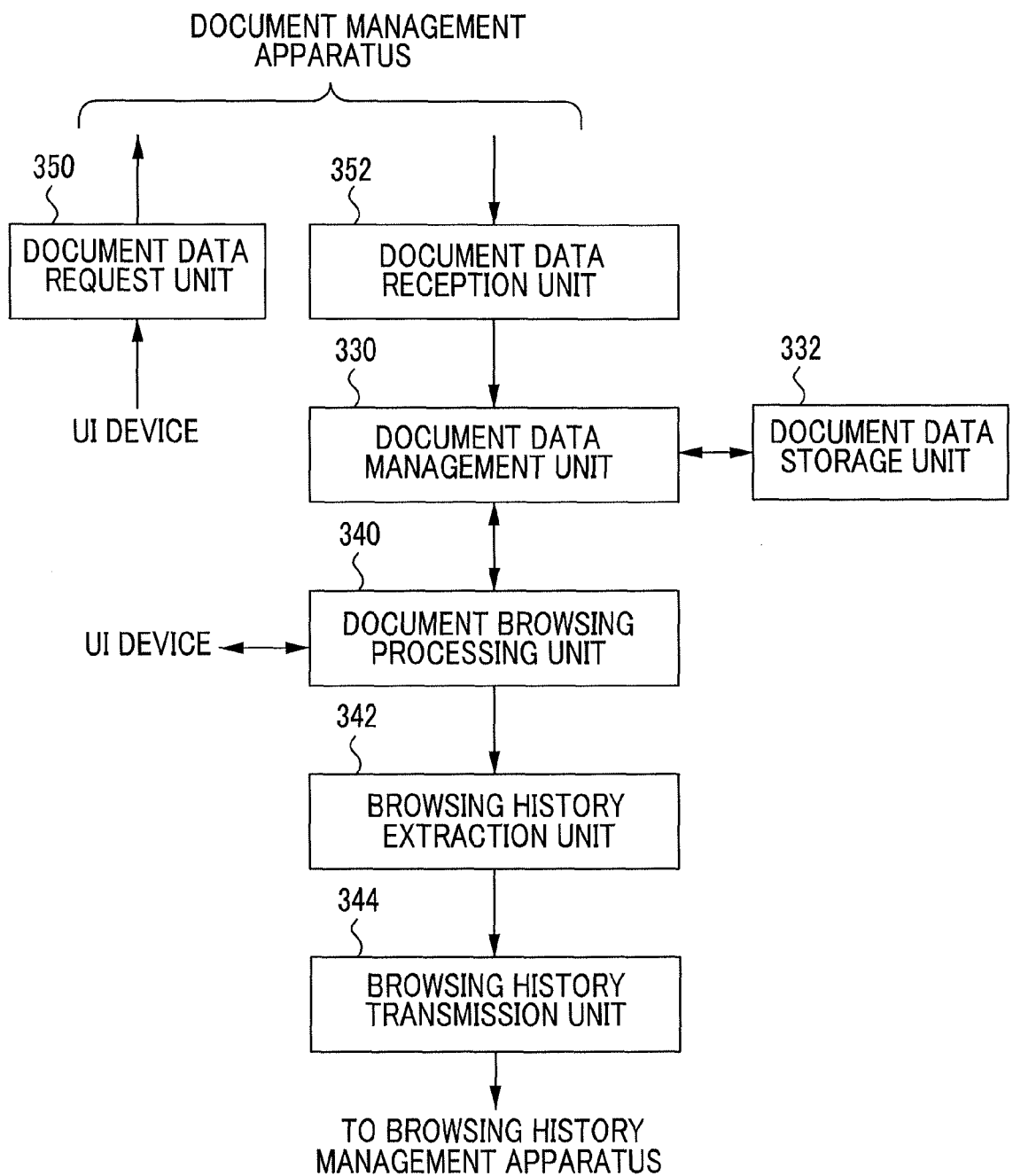
FIG. 13 is a block diagram illustrating a document browsing apparatus program operated in the document browsing apparatus according to the third exemplary embodiment.

FIG. 13 is a block diagram illustrating a document browsing apparatus program 30A which is operated in the document browsing apparatus 3A according to the third exemplary embodiment.

As illustrated in FIG. 13, the document browsing apparatus program 30A includes a document data request unit 350, a document data reception unit 352, a document data management unit 330, a document data storage unit 332, a document browsing processing unit 340, a browsing history extraction unit 342, and a browsing history transmission unit 344.

The document browsing apparatus program 30A is different from the document browsing apparatus program 30 illustrated in FIG. 4 in that the document identification information generation unit 310 and the like are omitted.

In the present exemplary embodiment, document identification information of a document delivered to the document browsing apparatus 3A is generated by the document management apparatus 5.

The document data request unit 350 generates document data request which is information for requesting the document management apparatus 5 to transmit document data by a user operating the UI device 180, and transmits the document data request to the document management apparatus 5.

The document data reception unit 352 receives document data transmitted from the document management apparatus 5 in response to the document data request, and outputs the document data to the document data management unit 330.

In addition, the document data management unit 330 stores the document data in the document data storage unit 332 in a case where the document data is transmitted from the document management apparatus 5 in a download form, but does not store the document data in the document data storage unit 332 in a case where the document data is transmitted in a streaming form.

Figure 14:
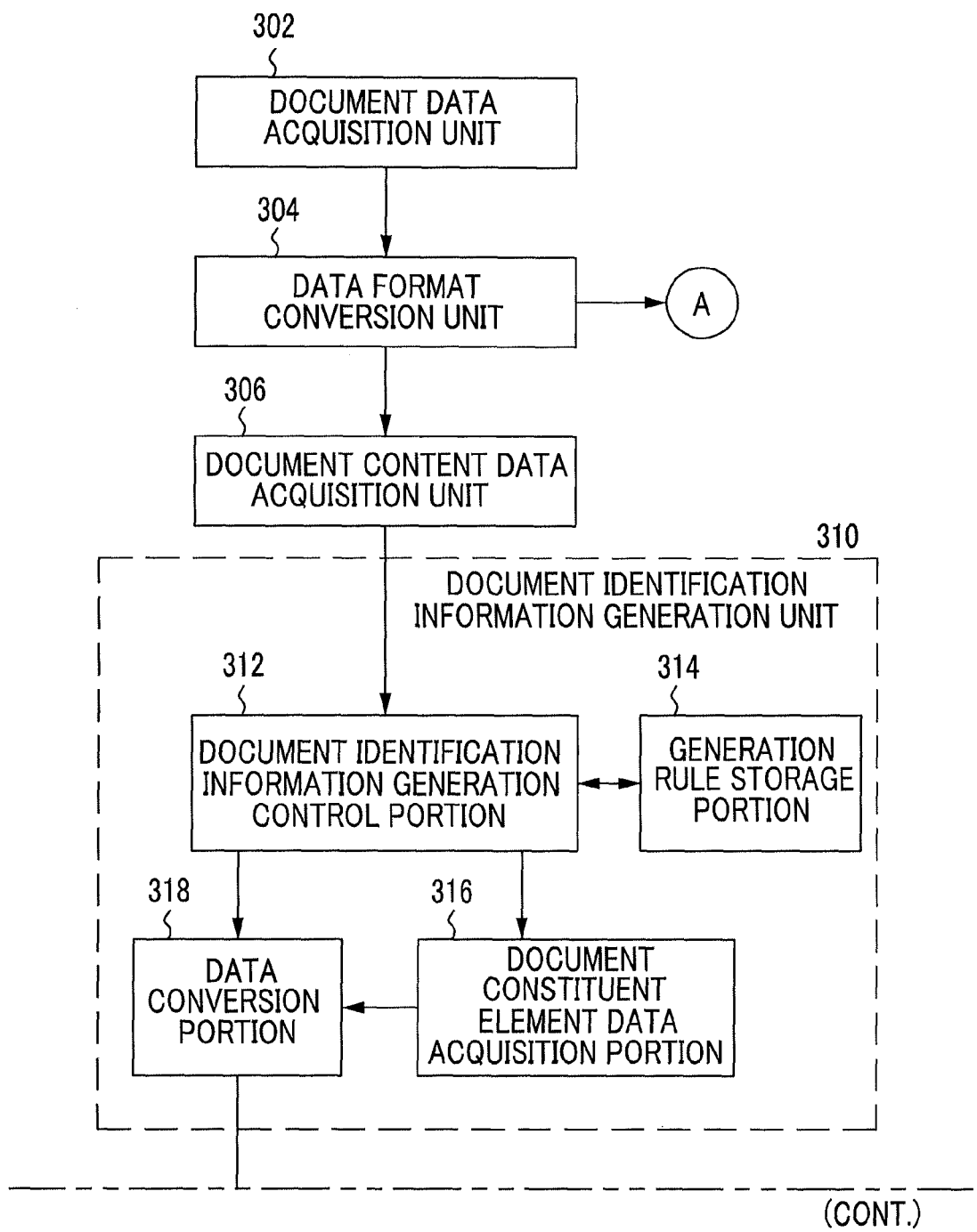
FIG. 14 is a block diagram illustrating the document management apparatus program operated in the document management apparatus according to the third exemplary embodiment.

FIG. 14 is a block diagram illustrating a document management apparatus program 50 which is operated in the document management apparatus 5 according to the third exemplary embodiment.

As illustrated in FIG. 14, the document management apparatus program 50 includes a document data acquisition unit 302, a data format conversion unit 304, a document content data acquisition unit 306, a document identification information generation unit 310, a document data management unit 330, a document data storage unit 332, a document data request reception unit 502, and a document data transmission unit 504.

The document identification information generation unit 310 includes a document identification information generation control portion 312, a generation rule storage portion 314, a document constituent element data acquisition portion 316, and a data conversion portion 318.

As illustrated in FIG. 14, the document management apparatus program 50 includes the document identification information generation unit 310 of the document browsing apparatus program 30 illustrated in FIG. 4.

Therefore, the document management apparatus 5 (the document management apparatus program 50) generates document identification information on the basis of document content data according to the same generation rule as a generation rule stored in the document browsing apparatus 3-3.

Accordingly, for example, document identification information of the document A generated by the document management apparatus 5 is the same as document identification information of the document A generated by the document browsing apparatus 3-3.

The document data request reception unit 502 receives a document data request from the document browsing apparatus 3A, and outputs the received document data request to the document data transmission unit 504.

The document data transmission unit 504 controls the document data management unit 330 so as to acquire document data stored in the document data storage unit 332 in response to the document data request, and transmits the acquired document data to the document browsing apparatus 3A which has transmitted the document data request.

In addition, although, in the present exemplary embodiment, the document management apparatus 5 and the browsing history management apparatus 4 are separate apparatuses, each constituent element of the two may also be incorporated into the same apparatus.

Fourth Exemplary Embodiment

Next, the fourth exemplary embodiment will be described.

Figure 15:
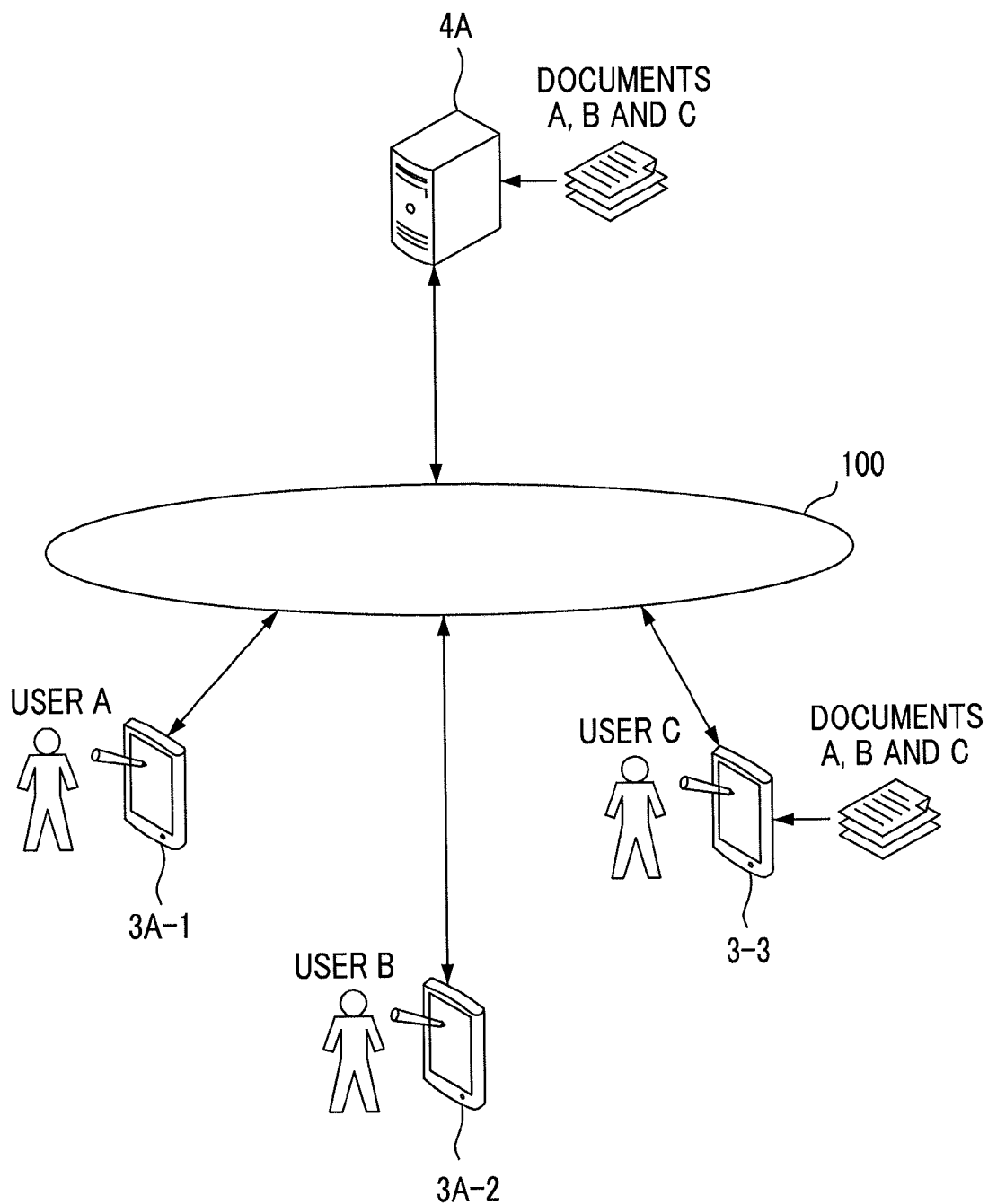
FIG. 15 is a diagram illustrating a document management system according to a fourth exemplary embodiment.

FIG. 15 is a diagram illustrating a document management system 24 according to the fourth exemplary embodiment.

As illustrated in FIG. 15, the document management system 24 includes document browsing apparatuses 3A-1, 3A-2 and 3-3, and a browsing history management apparatus 4A which are connected to each other via a network 100.

The browsing history management apparatus 4A manages browsing history received from the document browsing apparatus 3, and displays the browsing history, for example, through an operation by an administrator of the browsing history management apparatus 4A.

In addition, the browsing history management apparatus 4A has a function of the document management apparatus 5, and generates and registers document data by performing an electronic process on the acquired document so as to computerize the document, and performs a conversion process on the document as necessary.

In addition, the browsing history management apparatus 4A acquires document content data (content item data) indicating content of an acquired document, and generates document identification information for identifying the document on the basis of the document content data according to a predefined rule.

Further, the browsing history management apparatus 4A receives browsing history regarding document identification information which has already been generated, then generates document constituent element identification information in relation to a document constituent element included in a document corresponding to the document identification information, and changes past browsing history which has already been stored.

Figure 16:
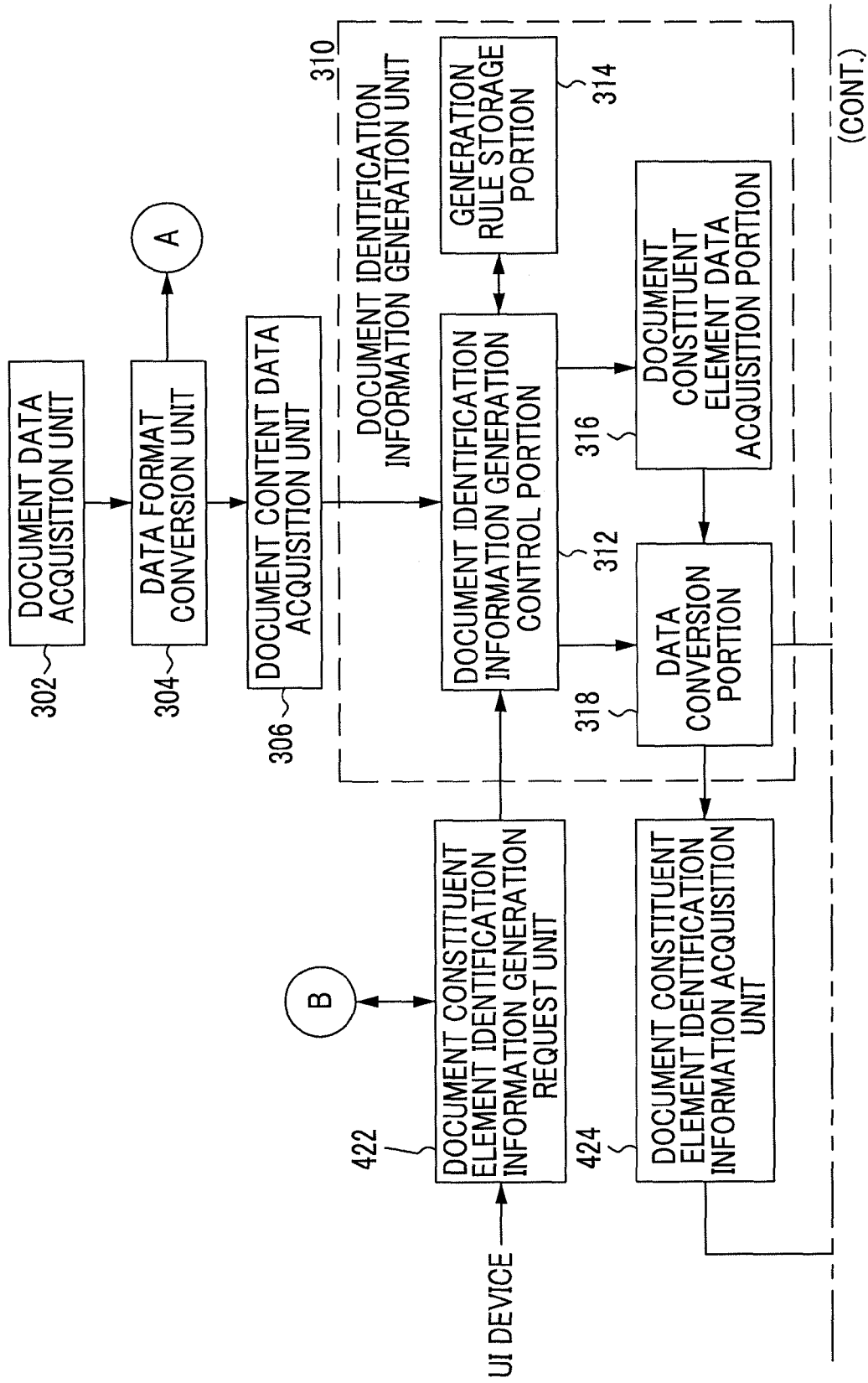
FIG. 16 is a block diagram illustrating a browsing history management apparatus program operated in the browsing history management apparatus according to the fourth exemplary embodiment.

FIG. 16 is a block diagram illustrating a browsing history management apparatus program 40A which is operated in the browsing history management apparatus 4A according to the fourth exemplary embodiment.

As illustrated in FIG. 16, the browsing history management apparatus program 40A includes a document data acquisition unit 302, a data format conversion unit 304, a document content data acquisition unit 306, a document identification information generation unit 310, a document data management unit 330, a document data storage unit 332, a document data request reception unit 502, a document data transmission unit 504, a browsing history reception unit 400, a browsing history storage unit 402, a browsing history display format instruction unit 404, a browsing history analysis unit 410, a browsing history display processing unit 412, a document constituent element identification information generation request unit 422, a document constituent element identification information acquisition unit 424, and a browsing history changing unit 426.

The document identification information generation unit 310 includes a document identification information generation control portion 312, a generation rule storage portion 314, a document constituent element data acquisition portion 316, and a data conversion portion 318.

As illustrated in FIG. 16, the browsing history management apparatus program 40A includes the document identification information generation unit 310 of the document browsing apparatus program 30 illustrated in FIG. 4.

Therefore, the browsing history management apparatus 4A (the browsing history management apparatus program 40A) generates document identification information on the basis of document content data according to the same generation rule as a generation rule stored in the document browsing apparatus 3-3.

Accordingly, for example, document identification information of the document A generated by the browsing history management apparatus 4A is the same as document identification information of the document A generated by the document browsing apparatus 3-3.

The document constituent element identification information generation request unit 422 receives a document constituent element identification information generation request which is information for requesting generation of document constituent element identification information regarding a document constituent element constituting a certain document by an administrator of the browsing history management apparatus 4A operating the UI device 180, from the UI device 180.

When the document constituent element identification information generation request is received, the document constituent element identification information generation request unit 422 controls the document data management unit 330 so as to acquire document content data corresponding to the document constituent element identification information generation request from the document data storage unit 332.

In addition, the document constituent element identification information generation request unit 422 outputs the acquired document content data to the document identification information generation control portion 312.

At this time, the document identification information generation control portion 312 instructs the document constituent element data acquisition portion 316 to extract document constituent element data from the document content data.

The document constituent element data acquisition portion 316 extracts the document constituent element data from the document content data.

The data conversion portion 318 converts the document constituent element data extracted by the document constituent element data acquisition portion 316 by using a function shown in a conversion method of the generation rule stored in the generation rule storage portion 314, generates the obtained data through the conversion as document constituent element identification information which is output to the document constituent element identification information acquisition unit 424 in correlation with a position information of the corresponding document constituent element.

The document constituent element identification information acquisition unit 424 acquires document constituent element identification information and position information of a document constituent element corresponding to the document constituent element identification information and outputs the acquired position information to the browsing history changing unit 426.

The browsing history changing unit 426 changes browsing history stored in the browsing history storage unit 402 by using the document constituent element identification information and the position information of the document constituent element corresponding to the document constituent element identification information.

Figure 17A:
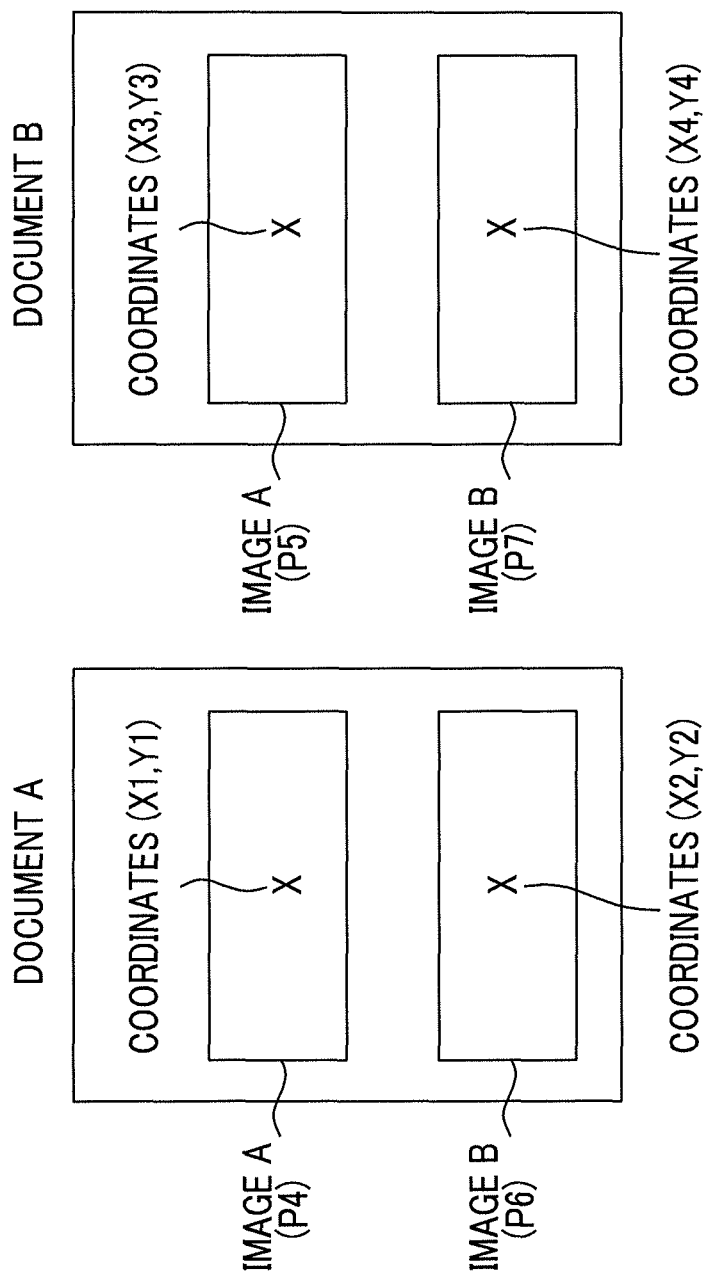

FIGS. 17A to 17C are diagrams exemplifying a changing process of browsing history.

FIG. 17A exemplifies a document A and a document B.

The document A includes an image A and an image B, the image position information of the image A is P4, and P4 includes the coordinates (X1,Y1).

In addition, image position information of the image B is P6, and P6 includes the coordinates (X2,Y2).

The document B includes the image A and an image C, image position information of the image A is P5, and P5 includes the coordinates (X3,Y3).

In addition, image position information of the image C is P7, and P7 includes the coordinates (X4,Y4).

FIG. 17B exemplifies browsing history before being changed, and FIG. 17C exemplifies browsing history after being changed.

As exemplified in FIG. 17B, the browsing history before being changed does not include document constituent element identification information (identification information of the images A, B and C).

This is because generation source data is the overall document content data in the generation rule.

The browsing history changing unit 426 detects that the position is present in the region (P4) of the image A from the document identification information and the position (X1, Y1) of the document A in the browsing history at the time point #1.

Therefore, the browsing history changing unit 426 adds the document constituent element identification information of the image A to the browsing history at the time point #1.

Similarly, the browsing history changing unit 426 detects that the position is present in the region (P6) of the image B from the document identification information and the position (X2,Y2) of the document A in the browsing history at the time point #2, and adds the document constituent element identification information of the image B to the browsing history at the time point #2.

In addition, the browsing history changing unit 426 detects that the position is present in the region (P5) of the image A from the document identification information and the position (X3,Y3) of the document B in the browsing history at the time point #3, and adds the document constituent element identification information of the image A to the browsing history at the time point #3.

Further, the browsing history changing unit 426 detects that the position is present in the region (P7) of the image C from the document identification information and the position (X4,Y4) of the document B in the browsing history at the time point #4, and adds the document constituent element identification information of the image C to the browsing history at the time point #4.

At this time, even in a case where the document constituent element identification information is not initially included in the browsing history, the browsing history management apparatus 4A adds document constituent element identification information to browsing history later so as to change the browsing history to the browsing history as exemplified in FIG. 11C.

Thereby, it is possible to extract browsing history regarding, for example, the image A.

In addition, although, in the present exemplary embodiment, the browsing history management apparatus 4A stores document data, the browsing history management apparatus 4A may not store document data.

In this case, the browsing history management apparatus 4A may request the document browsing apparatus 3 or the like storing document data to generate document constituent element identification information, and acquire the document constituent element identification information and position information of a document constituent element corresponding to the document constituent element identification information from the document browsing apparatus 3 or the like.

In addition, the request for generation of document constituent element identification information may be made by the document browsing apparatus 3 (a user thereof).

In this case, the document browsing apparatus 3 may generate document constituent element identification information by using document data stored therein, and transmit the generated document constituent element identification information to the browsing history management apparatus 4A in correlation with position information of a corresponding document constituent element.

In addition, the document browsing apparatus 3 may transmit only document constituent element identification information and position information regarding a specific document constituent element (for example, the image A) to the browsing history management apparatus 4A.

At this time, the browsing history management apparatus 4A transmits the specific document constituent element identification information (for example, the image A) generated by the document browsing apparatus 3-1 (or the browsing history management apparatus 4A) to the other document browsing apparatuses 3-2 and 3-3.

As described above, the document browsing apparatuses 3-2 and 3-3 may generate document constituent element identification information pieces by using document data stored therein, and transmit a corresponding specific document constituent element identification information (for example, the image A) of the generated document constituent element identification information pieces, and position information of a corresponding document constituent element, to the browsing history management apparatus 4A.

In addition, although, in the exemplary embodiment, the browsing history management apparatus 4A generates document constituent element identification information regarding all of document constituent elements later, document constituent element identification information regarding only a specific document constituent element may be generated.

In this case, the document constituent element identification information generation request unit 422 designates a document constituent element (for example, the image A) with the UI device 180 or the like, the document constituent element data acquisition portion 316 acquires only corresponding document constituent element data, and the data conversion portion 318 generates only corresponding document constituent element identification information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a hardware processor;
    a data acquisition unit that acquires content item data indicating a content item;
    an identification information generation unit, executed by the processor, that (i) generates identification information of the content item on the basis of the content item data acquired by the data acquisition unit according to a predefined rule and (ii) generates identification information of a constituent dement on the basis of constituent element data that forms the content item data: and
    a browsing history extraction unit that extracts a browsing history of a user regarding the content item and associates the browsing history with both of the identification information of the content item and the identification information of the constituent element, both of the identification elements being generated by the identification information generation unit;
    wherein the browsing history includes operation position information that indicates a position coordinate of the content item corresponding to a touch position touched by a user, and
    wherein the browsing history extraction unit associates the operation position information with the identification information of the constituent dement.

2. The information processing apparatus according to claim 1, wherein
    the predefined rule includes a function which outputs the same value for the same input value, and
    the identification information generation unit generates identification information of the content item by converting content item data using the function.

3. The information processing apparatus according to claim 1, wherein the identification information generation unit generates identification information of the content item on the basis of at least one content item constituent element forming the content item.

4. A content item management system comprising:
    a hardware processor;
    a data acquisition unit that acquires content item data indicating a content item;
    an identification information generation unit executed by the processor, that (i) generates identification information of the content item on the basis of the content item data acquired by the data acquisition unit according to a predefined rule and (ii) generates identification information of a constituent element on the basis of constituent element data that forms the content item data:
    a browsing history extraction unit that extracts a browsing history of a user regarding the content item and associates the browsing: history with both of the identification information of the content item and the identification information of the constituent element, both of the identification elements being generated by the identification information generation unit; and
    a browsing history management unit that manages the browsing history extracted by the browsing history extraction unit on the basis of the identification information of the content item;

wherein the browsing history includes operation position information that indicates a position coordinate of the content item corresponding to a touch position touched by a user, and wherein the browsing history extraction unit associates the operation position information with the identification information of the constituent element.

5. The content item management system according to claim 4, wherein the identification information generation unit generates identification information of the content item on the basis of at least one content item constituent element forming the content item, and wherein the browsing history management unit manages browsing history for each content item constituent element.

6. The content item management system according to claim 4, further comprising:

a constituent element identification information generation unit that generates constituent element identification information for identifying at least one content item constituent element forming a content item after browsing history is extracted by the browsing history extraction unit; and a browsing history changing unit that changes the browsing history which has already been extracted, using the constituent element identification information generated by the constituent element identification information generation unit.

7. A content item management system comprising:

at least one information processing apparatus comprising a processor, and a browsing history management apparatus that manages browsing history of a user regarding a content item, wherein the information processing apparatus includes
a data acquisition unit that acquires content item data indicating a content item;

an identification information generation unit that (i) generates identification information of the content item on the basis of the content item data acquired by the data acquisition unit according to a predefined rule and (ii) generates identification information of a constituent element on the basis of constituent element data that forms the content item data;

a browsing history extraction unit that extracts a browsing history of a user regarding the content item and associates the browsing history with both of the identification information of the content item and the identification information of the constituent element, both of the identification elements being generated by the identification information generation unit; and a transmission unit that transmits the browsing history to the browsing history management apparatus, and wherein the browsing history management apparatus includes
a browsing history management unit that manages the browsing history transmitted from the information processing apparatus on the basis of the identification information of the content item, wherein the browsing history includes operation position information that indicates a position coordinate of the content item corresponding to a touch position touched by a user, and wherein the browsing history extraction unit associates the operation position information with the identification information of the constituent element.

8. A non-transitory computer readable medium storing a program causing a computer to execute a process,
the process comprising:
acquiring content item data indicating a content item;
generating (i) identification information of the content item on the basis of the acquired content item data according to a predefined rule and (ii) identification information of a constituent element on the basis of constituent element data that forms the content item data; and extracting a browsing history of a user regarding the content item in correlation with the generated identification information of the content item;

associating the browsing history with both of the identification information of the content item and the identification information of the constituent element, wherein the browsing history includes operation position information that indicates a position coordinate of the content item corresponding to a touch position touched by a user, and wherein the operation position information is associated with the identification information of the constituent element.

9. An information processing method comprising:
acquiring content item data indicating a content item;
generating (i) identification information of the content item on the basis of the acquired content item data according to a predefined rule and (ii) identification information of a constituent element on the basis of constituent element data that forms the content item data; and extracting a browsing history of a user regarding the content item in correlation with the generated identification information of the content item, associating the browsing history with both of the identification information of the content item and the identification information of the constituent element, wherein the browsing history includes operation position information that indicates a position coordinate of the content item corresponding to a touch position touched by a user, and wherein the operation position information is associated with the identification information of the constituent element.

10. The information processing apparatus according to claim 1, wherein the data acquisition unit acquires document data as the content item data, and the identification information generation unit generates the identification information of the constituent element on the basis of at least one of headline data, text data or image data as constituent element data.

* * * * *